(12) United States Patent
Russell et al.

(10) Patent No.: US 12,110,307 B2
(45) Date of Patent: Oct. 8, 2024

(54) SELF-IMMOLATIVE SYSTEMS

(71) Applicant: THE SECRETARY OF STATE FOR DEFENCE, Salisbury (GB)

(72) Inventors: Andrew Russell, Reading (GB); Wayne Cord Hayes, Reading (GB); Mark Rodney Sambrook, Salisbury (GB); Flavien Leroux, Reading (GB); Aaron Acton, Reading (GB); Antonio Feula, Reading (GB); Alexander Gabriel Gavriel, Reading (GB)

(73) Assignee: The Secretary of State for Defence, Salisbury (GB)

(*) Notice: Subject to any disclaimer, the term of this patent is extended or adjusted under 35 U.S.C. 154(b) by 637 days.

(21) Appl. No.: 17/280,240

(22) PCT Filed: Oct. 29, 2019

(86) PCT No.: PCT/GB2019/000150
§ 371 (c)(1),
(2) Date: Mar. 26, 2021

(87) PCT Pub. No.: WO2020/089571
PCT Pub. Date: May 7, 2020

(65) Prior Publication Data
US 2021/0340166 A1 Nov. 4, 2021

(30) Foreign Application Priority Data
Oct. 30, 2018 (GB) ..................... 1817730

(51) Int. Cl.
*C07F 9/50* (2006.01)
*A62D 3/30* (2007.01)
(Continued)

(52) U.S. Cl.
CPC .............. *C07F 9/5031* (2013.01); *A62D 3/30* (2013.01); *C07F 9/5022* (2013.01); *C07F 9/5442* (2013.01); *C07F 9/70* (2013.01)

(58) Field of Classification Search
CPC ........ C07F 9/50; C07F 9/5022; C07F 9/5031; C07F 9/54; C07F 9/5442; C07F 9/70; G01N 31/22
See application file for complete search history.

(56) References Cited

FOREIGN PATENT DOCUMENTS

| DE | 2539726 | * | 3/1977 | ............. C07F 9/5407 |
| DE | 2539726 A | * | 3/1977 | ............. C07F 9/5407 |
(Continued)

OTHER PUBLICATIONS

Loudwig et al "N-methyl-N-(o-nitrophenyl)carbamates as photolabile alcohol protecting groups," Tetrahedron Letters, Nov. 5, 2001, pp. 7957-7959, vol. 42, No. 45, Elsevier Science Ltd.*
(Continued)

*Primary Examiner* — Brian P Mruk
(74) *Attorney, Agent, or Firm* — Kilpatrick Townsend & Stockton LLP

(57) ABSTRACT

The present invention is concerned with self-immolative recognition and/or responsive systems for electrophilic compounds, especially alkylating agents, which systems may comprise disclosure or detection of the alkylating agent. The present invention is especially concerned with non-protic triggered self-immolative systems, molecules, and methods, and in particular for detection of non-protic electrophilic agents, and especially alkylating agents, for example alkyl or benzylic halides, which may be found in pesticides or fumigants, or chemical warfare agents.

12 Claims, 13 Drawing Sheets

(51) Int. Cl.
  C07F 9/54    (2006.01)
  C07F 9/70    (2006.01)
  G01N 31/22   (2006.01)

(56) References Cited

FOREIGN PATENT DOCUMENTS

| EP | 2630481 A2 | 8/2013 |
|---|---|---|
| JP | 2017057151 A | 3/2017 |
| WO | 2006131552 A1 | 12/2006 |

OTHER PUBLICATIONS

International Patent Application No. PCT/GB2019/000150, International Preliminary Report on Patentability dated May 14, 2021, 8 pages.
United Kingdom Patent Application No. GB1817730.3, Search Report dated Apr. 15, 2019, 5 pages.
International Patent Application No. PCT/GB2019000150, International Search Report and Written Opinion dated Jan. 31, 2020, 14 pages.
United Kingdom Patent Application No. GB1915396.4, Combined Search and Examination Report dated Apr. 16, 2020, 7 pages.
Karthikraj et al., "p-Tolyl isocyanate derivatization for analysis of CWC-related polar degradation products by mass spectrometry", Analytical and Bioanalytical Chemistry, 2014, pp. 5093-5102, vol. 406, Springer.
"(1-Methylethyl)phenyl-2-(dimethylamino)ethyl ester carbamic acid," CAS Registry No. 848123-67-1, Apr. 8, 2005, Chemical Abstracts.
"4-[Butyl[[2-( diethylamino)ethoxy]carbonyl]amino ]benzoic acid," CAS Registry No. 805205-91-8, Dec. 29, 2004, Chemical Abstracts.
"Methyl(3-propoxyphenyl )-2-(diethylamino)ethyl ester carbamic acid," CAS Registry No. 792131-57-8, Dec. 5, 2004, Chemical Abstracts.
Database Caplus, "Local anesthetics. XLIX. Basic esters of N-alkyl-substituted alkoxycarbanillic acids with a spasmolytic and local anesthetic effect," 1975, pp. 53-58, vol. 24, No. 2, Database accession No. 1976:432594, Chemical Abstracts Service, Columbus, Ohio, US.
Database Caplus, "Some physicochemical properties and molecular connectivity of spasmolytic basic carbamates," 1980, pp. 32-34, vol. 29, No. 1, Database accession No. 1980:579364, Chemical Abstracts Service, Columbus, Ohio, US.
Sun et al., "Photography Coupled with Self-Propagating Chemical Cascades: Differentiation and Quantitation of G- and V-Nerve Agent Mimics via Chromaticity," ACS Central Science, Jul. 25, 2018, pp. 854-861, vol. 4, No. 7, American Chemical Society.
Sun et al., "Coupling Activity-Based Detection, Target Amplification, Colorimetric and Fluorometric Signal Amplification, for Quantitative Chemosensing of Fluoride Generated from Nerve Agents," Chemistry—A European Journal, Mar. 17, 2017, pp. 3903-3909, vol. 23, No. 16, Wiley-VCH Verlag GmbH & Co. & KGaA, Weinheim, Germany.
Acton et al., "Self-immolative systems for the disclosure of reactive electrophilic alkylating agents," ChemComm, Apr. 4, 2019, pp. 5219-5222, vol. 55, The Royal Society of Chemistry.
Liu et al., "Self-Immolative Polymersomes for High-Efficiency Triggered Release and Programmed Enzymatic Reactions," Journal of the American Chemical Society, 2014, pp. 7492-7497, vol. 136, American Chemical Society.

* cited by examiner

7: $R_1 = R_2 = H, R_3 = NO_2, R_4 = H$
8: $R_1 = CH_3, R_2 = H, R_3 = NO_2, R_4 = H$
9: $R_1 = R_2 = CH_3, R_3 = NO_2, R_4 = H$
10: $R_1 = R_2 = R_3 = H, R_4 = NO_2$
11: $R_1 = CH_3, R_2 = R_3 = H, R_4 = NO_2$
12: $R_1 = R_2 = CH_3, R_3 = H, R_4 = NO_2$
13: $R_1 = R_2 = R_3 = CH_3, R_4 = NO_2$
14: $R_1 = R_2 = R_3 = CH_3, R_4 = H$
15: $R_1 = R_2 = R_3 = CH_3, R_4 = H$

Yeild: 35-73%

16: $R_1 = R_2 = H, R_3 = NO_2, R_4 = H$
17: $R_1 = CH_3, R_2 = H, R_3 = NO_2, R_4 = H$
18: $R_1 = R_2 = CH_3, R_3 = NO_2, R_4 = H$
19: $R_1 = R_2 = R_3 = H, R_4 = NO_2$
20: $R_1 = CH_3, R_2 = R_3 = H, R_4 = NO_2$
21: $R_1 = R_2 = CH_3, R_3 = H, R_4 = NO_2$
22: $R_1 = R_2 = R_3 = CH_3, R_4 = NO_2$
23: $R_1 = R_2 = R_3 = CH_3, R_4 = H$
24: $R_1 = R_2 = R_3 = CH_3, R_4 = H$

SELF-IMMOLATIVE SYSTEMS

The present invention is concerned with recognition and/or responsive systems for electrophilic compounds, especially alkylating agents, which systems may comprise disclosure or detection of the alkylating agent, and/or may comprise the release of a chemical reagent, to for example react with the alkylating agent, such as to neutralise or decontaminate the agent, or to instigate a further chemical reaction, such as to initiate or provide a therapy or treatment to the alkylating agent. The chemical reagent released could also initiate gelation or sequestration of the alkylating agent. The present invention is especially concerned with detection and/or decontamination of chemical warfare agents or pesticides, or related materials.

The present invention is also concerned with non-protic triggered self-immolative systems, molecules, and methods, and in particular for detection of non-protic electrophilic agents, such as chemical warfare agents, and especially alkylating agents, for example alkyl or benzylic halides, which may be found in pesticides or fumigants, or chemical warfare agents. The invention provides for self-immolative molecules and methods for achieving detection or disclosure of chemical warfare agents, and especially alkylating chemical warfare agents, which molecules and methods may provide for colorimetric based detection.

The need for effective methods for the disclosure and detection, measurement and decontamination of chemical warfare agents has increased in recent years. The methods to be used for detection should be able to not only detect the presence of a specific agent, but need to be as sensitive as possible, and preferably be quantitative, and able to identify the agent, or class of agent.

Most chemical warfare agents are categorised as electrophilic compounds. Of particular concern are the G and V series nerve agents (phosphorylating agents) because of their extreme toxicity, but also sulfur mustards (such as H and HD), and nitrogen mustards (such as HN1, HN2 and HN3), which are alkylating agents. Current approaches to their detection and identification include gas chromatography interfaced with mass spectrometry (GCMS), ion mobility spectrometry, infra-red spectroscopy and Raman spectroscopy, all of which are heavily instrumentation based. The ability to detect trace amounts of agents can be a particular challenge, as a result of the limits of sensitivity of these techniques. There is in particular a need to develop field deployable technologies.

There is consequently a need for new techniques/approaches to detection of chemical warfare agents which are capable of increasing sensitivity, reducing or eradicating the need for instrumentation, and which can preferably be undertaken at ambient temperature, thus removing any requirement for heating of the sample. In particular there is a need for systems and methods that can be easily field deployable.

The present invention thus generally aims to provide new techniques/approaches suitable for recognising and responding to electrophilic compounds, especially chemical warfare agents, and more especially alkylating agents, which techniques in particular enable detection and field deployability, and which may additionally improve sensitivity, reduce the need for instrumentation and/or reduce or remove the need for applying heating to achieve the detection.

Accordingly, in a first aspect, the present invention provides a self-immolative molecule suitable to be triggered by non-protic electrophilic compounds/agents, wherein the self-immolative molecule comprises at least one trigger portion linked to at least one releasable portion via a self-immolative portion, wherein the trigger portion comprises a neutral nucleophile selected from the neutral nucleophiles $-R_3SR_1$, $-R_3NR_1R_2$, $-R_3PR_1R_2$ or $R_3AsR_1R_2$, wherein $R_1$ and $R_2$ are selected from H, alkyl, aryl or heteroaryl, S is sulfur, N is nitrogen, P is phosphorous and As is arsenic, and $R_3$ is a chemical moiety capable of undergoing β-elimination, and thus $R_3$ is at least a part of the self-immolative portion.

The Applicant has noted that molecules comprising an S-based neutral nucleophile generally are slow to be triggered, but undergo a fairly rapid β-elimination step, molecules comprising an N-based neutral nucleophile also generally have a slow triggering step, followed by a very slow (or even in some cases no) β-elimination step, whereas P-based neutral nucleophiles generally possess a good balance between the triggering step 1 and β-elimination step 2. Thus, in one embodiment the trigger portion comprises a neutral nucleophile selected from the neutral nucleophiles $-R_3SR_1$, and $-R_3PR_1R_2$, wherein $R_1$ and $R_2$ are selected from H, alkyl, aryl, or heteroaryl, S is sulfur, P is phosphorous and $R_3$ is a chemical moiety capable of undergoing β-elimination. In a preferred embodiment the neutral nucleophile is $R_3PR_1R_2$, as such a species possesses a good balance in the speed of triggering and β-elimination.

In a preferred embodiment, the neutral nucleophile is $R_3PR_1R_2$, wherein $R_1$, and/or $R_2$ are phenyl functional groups or substituted phenyl functional groups. Trigger portions comprising such neutral nucleophiles have been shown to be particularly effective in self-immolative molecules, especially those with $R_1$ and $R_2$ both comprising phenyl functional groups or substituted phenyl functional groups.

In one embodiment, the electrophilic compounds/agents are chemical warfare agents. In another embodiment, the electrophilic compounds/agents are alkylating agents, which alkylating agents may also be chemical warfare agents.

The Applicant has designed and synthesised self-immolative molecules that represent the first examples of selective self-immolative systems that are capable of being triggered by a non-protic electrophilic species, such as alkylating agents, for example alkyl and benzylic halides.

Self-immolative molecules/systems are known in the art and comprise at least one trigger portion and at least one releasable portion (which could also be a reporter portion), and a self-immolative portion, whereby under certain conditions the trigger portion may be removed or activated to bring about self-cascade degradation (self-immolation) of the molecule to thereby release the releasable portion.

Self-immolative systems are designed to release a chemical moiety (releasable portion), or a plurality of chemical moieties, upon a pre-determined cleavage event, or a sequence of events. They can beneficially be used in, for example, a variety of therapeutic, detection, identification, diagnostic and other industrial applications.

Self-immolative elimination has been exploited as a technique in a range of systems (predominantly drug delivery), utilising a stable bond between protecting group(s) and leaving group(s), which become labile upon activation. Classical self-immolative linkers combine a protecting group, associated with the trigger portion, which on cleavage from the trigger portion generates an active species, releasing a leaving group (releasable portion or reporter portion).

Classical self-immolative chemistries operate by activation or deprotection of the trigger portion by nucleophiles (e.g. peroxide, fluoride, thiol) to render the immolative portion labile via generation of an electron rich nucleophilic centre that culminates in the release or liberation of the releasable portion.

The obvious exception to this classical approach to triggering of the self-immolative event is the protic cleavage of a tert-butyl carbamate (t-Boc) group to reveal, after neutralisation, a nucleophilic amine. This behaviour is however peculiar to a proton alone. In the case of any other electrophilic species/agents, such as an alkylating agent, reacting with a neutral nucleophile, such as the oxygen in t-Boc, would generate a cationic species that would then be even more difficult to convert to a nucleophile. Moreover, the self-immolative molecules of the present invention, if protonated would not then undergo self-immolative degradation, and consequently would not release or liberate the releasable portion, or reporter group. The self-immolative molecules are thus critically capable of distinguishing between Bronsted (or Bronsted-Lowry) acids, which are proton ($H^+$ ion) donors, from other electrophilic compounds/agents, such as alkylating agents.

Until now self-immolative chemistries for non-protic electrophilic species, such as chemical warfare agents, fumigants, pesticides and pharmaceuticals, in particular alkylating agents, have not existed. The challenge to generate such a system has been to create a triggering system (triggering portion) that responds to a non-protic electrophilic species/agent in such a way as to allow indirect generation of a nucleophilic electron rich centre in the trigger event.

Critically and as previously mentioned, a proton is not capable of triggering these molecules to self-immolate and release the releasable portion, thus providing a molecule that will not report in the presence of protons, and thus avoiding false positive results as a result of the presence of protons.

The releasable portion is designed to have a specific function, such as on release the function is utilised or displayed, which function could be to alert to the presence of the electrophilic compounds or alkylating agent. Thus the releasable portion could be a reporter group, which when released from the molecule is capable of reporting that degradation of the self-immolative molecule by the electrophilic species has occurred, such as through the generation of colour or fluorescence.

The self-immolative molecule may comprise more than one releasable portion or reporter group. For example the self-immolative molecule could be a polymer or dendrimer, comprising multiple releasable portions or multiple reporter groups, which could be triggered and undergo β-elimination to release multiple releasable portions/reporter groups, thus amplifying the function or signal.

In one embodiment, the releasable portion is capable of generating a detection/measurable response upon release, which could be the generation of colour or fluorescence. For example the releasable portion could be N-methyl-4-nitroanilide, released as N-methyl-4-nitroaniline, which is a vibrant yellow colour, though other suitable reporter groups will be apparent to the skilled person. The self-immolative molecules could thus comprise multiple releasable portions capable of generating colour upon release, thus amplifying the intensity/magnitude of the colour, thus making the molecules potentially much more sensitive to an electrophilic species/compound.

The releasable portion could alternatively be a molecule that undertakes a specific function, such as a therapeutic effect, or destruction or decontamination of the electrophilic agent that initiated its release, such as a molecule capable of decontaminating or destroying an electrophilic chemical warfare agent, or a catalytic or photocatalytic group that promotes the decontamination of an electrophilic compound.

The releasable portion could be any suitable chemical, and especially any suitable chemical capable of generating a detection/measurable response upon release, such as generation of colour or fluorescence, as would be apparent to the skilled person. The releasable portion could for example be based upon or incorporate phenol, nitrophenol, aniline or nitroaniline, or other aromatic, heteroaromatic or heterocyclic functional groups, which could provide for the generation of a colour. The releasable portion could also be based upon or incorporate such functional groups as 6-aminoquinoline or pyrene methylamine.

The self-immolative portion could be of any suitable chemical arrangement for self-immolation as will be apparent to the skilled person, but preferably comprises the functional group OC(O) (ester functionality) or alternatively SC(S). The self-immolative portion may comprise the structure —$CH_2$—OC(O)—.

The self-immolative molecule could have the following structural formula:

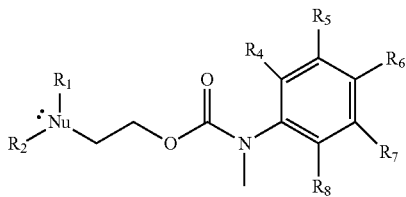

wherein Nu is S, P, As or N, $R_1$ and $R_2$ are H, alkyl, aryl or heteroaryl functional groups (though $R_2$ is absent when Nu is S), and $R_4$, $R_5$, $R_6$, $R_7$ and $R_8$ comprise between 0-3 methyl ($CH_3$) groups and at least 1 nitro ($NO_2$) group, with the remainder being hydrogen (H) atoms. Alternatively, especially where the self-immolative molecule is a polymer or dendrimer, $R_4$, $R_5$, $R_6$, $R_7$ and $R_8$ may not comprise a nitro group or methyl groups, but $R_4$, $R_5$, $R_6$, $R_7$ and $R_8$ may comprise further self-immolative portions (multiple (i.e. at least two) self-immolative portions), which may be alkyl, aryl or heteroaryl species, which portions may themselves each be linked to one or more releasable portions or reporter groups, which releasable portions or reporter groups may be an anilide or substituted anilide, which may comprise a nitro functional group or methyl functional groups. The releasable portions could for example be N-methyl-4-nitroanilide, or similar substituted anilides, or N-methyl or N-alkyl anilides or nitroanilides. The releasable portions could also for example be based upon or incorporate phenol, nitrophenol, or other aromatic, heteroaromatic or heterocyclic functional groups, and especially those capable of providing for the generation of a colour. Thus, the self-immolative molecule could thereby comprise multiple reporter groups capable of generating colour with an amplified response. The further self-immolative portions may comprise the structure OC(O) or —CH2—OC(O)—, which can be linked to a reporter group, such that the reporter group may be released as a result of β-elimination from the self-immolative molecule.

The Nu may in particular be sulfur (S), nitrogen (N) or phosphorus (P), and especially S or P, since N-containing neutral nucleophiles have generally been observed to undergo very slow (or minimal) β-elimination, and in a preferred embodiment Nu is phosphorus, since P-based self-immolative molecules have a good balance between the period for triggering the trigger portion and the period for undergoing β-elimination.

In one preferred embodiment, $R_6$ is $NO_7$, and $R_4$, $R_6$, $R_7$ and $R_8$ are H, the releasable portion N-methyl-4-nitroanilide, which upon self-immolation releases N-methyl-4-nitroaniline which is a vibrant yellow colour and particularly suitable for reporting the presence of the electrophilic species. The self-immolative molecule in an alternative embodiment may comprise multiple releasable portions, which portions may comprise multiple N-methyl-4-nitroanilide moieties, or alternative reporter groups capable, for example, of generating colour or fluorescence.

In another preferred embodiment, Nu is P, and $R_1$ and $R_2$ are phenyl functional groups or substituted phenyl functional groups. The balance between the rate of triggering the trigger portion with the electrophilic species and the consequent β-elimination to release the releasable portion is particularly effective when the trigger portion comprises a neutral nucleophile comprising phosphorus.

The molecule may comprise both the two preferred embodiments in the two paragraphs preceding this paragraph.

The self-immolative molecule could be polymeric and/or dendrimeric, providing the possibility for having multiple releasable portions, and the potential for amplification of the response to the triggering event, potentially providing for improved sensitivity over methods in the art, for example, more sensitive methods for detecting alkylating agents and/or chemical warfare agents. Reaction of a target electrophilic agent with a trigger group in a polymer or dendrimer could thereby give rise to a series of intramolecular reactions, which could for example depolymerise the entire structure. As such, a single reaction between the electrophilic agent and trigger group could result in the cleavage and release of large numbers of releasable portions. Where the released chemicals generate a measurable/detectable response, such as a colour change, then this response could be significantly amplified by using appropriate polymers or dendrimers.

These self-immolative molecules of the first aspect of the invention are capable of releasing the releasable portion following exposure to the electrophilic species in the presence of a mild/weak base.

Thus in a second aspect, the present invention provides a self-immolative triggered method for interrogating a sample suspected of comprising a non-acidic electrophilic agent comprising contacting the sample with a self-immolative molecule of the first aspect in the presence of a mild/weak base.

The mild base may be an organic base, such as trimethylamine, diisopropylethylamine, 2,6-lutidine, 1,5-diazabicyclo[4.3.0]non-5-ene, or 1,8-diazabicyclo[5.4.0]undec-7-ene. Diisopropylethylamine is a particularly preferred base since it is also of particularly low nucleophilicity. A favoured solvent in which to perform the method is acetonitrile, in which bases suitable for use in the method may have a $pK_aH^+$ of between about 17 to about 19.

A mild/weak base may also be considered one that does not ionize fully in an aqueous solution. A weak base may also be defined as a chemical base in which protonation is incomplete.

The immolation process is a two-step process in which alkylation of the neutral nucleophile is followed by base-induced β-elimination, and then further cascades via the self immolative portion, to cleave and release the releasable portion from the self-immolative molecule.

Suitable solvents for undertaking the method of the second aspect may be organic solvents such as acetonitrile, acetone, N-methylacetamide and nitromethane, which may be in the presence or absence of water. Suitable solvents could also include ionic liquids, such as 1-ethyl-3-methyl-imidazolium tetrafluoroborate, in the absence or presence of water. Solvent formulations may also include emulsions and microemulsions.

For an efficient detection system and method, it is important that all the required reagents can be present simultaneously and that the alkylation and elimination reactions can occur sequentially whilst avoiding side reactions. A one-pot reaction of alkylation-elimination can in particular be achieved using a self-immolative molecule having the molecular formula detailed above wherein Nu is P, $R_1$ and $R_2$ are phenyl functional groups, and $R_6$ is $NO_2$, and $R_4$, $R_6$, $R_7$ and $R_8$ are H, in the presence of a suitable base and suitable solvent. The base could, for example, be N,N-diisopropylethylamine (DIPEA), which can be mixed with the self-immolative molecule before addition of the electrophilic agent, thus providing a one-pot solution for, for example, chemical warfare agent detection without the need for use of burdensome analytical instrumentation.

Alkylation of the self-immolative molecule, such as when used in conjunction with an alkylating agent, may also be accelerated by the use of iodide salts as additional reagents, such as sodium iodide or tetrabutylammonium iodide.

The present invention shall now be discussed with respect to the following Examples and figures wherein FIG. 1 provides the chemical formulas for three self-immolative molecules (1 to 3) that have been synthesised and tested for their ability to detect electrophilic/alkylating agents;

Figure 5:
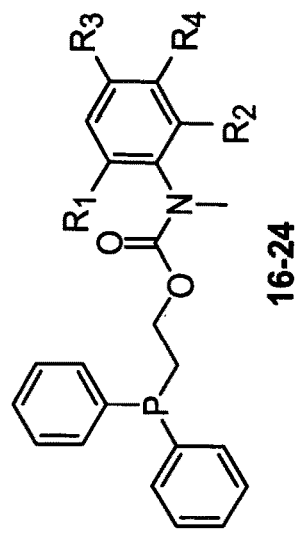
Figure 5:
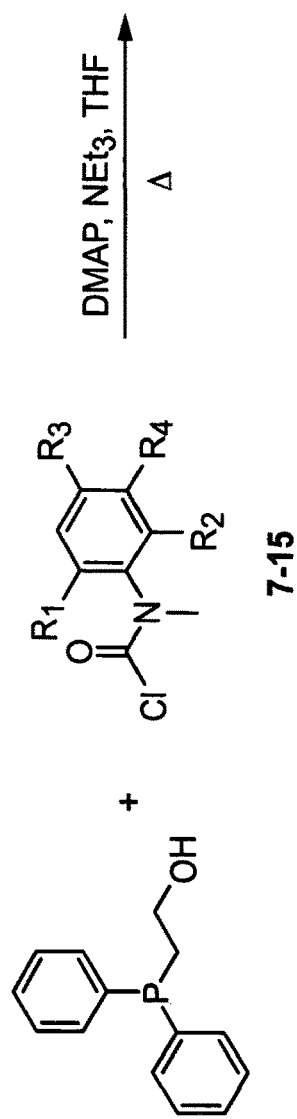
Figure 6:
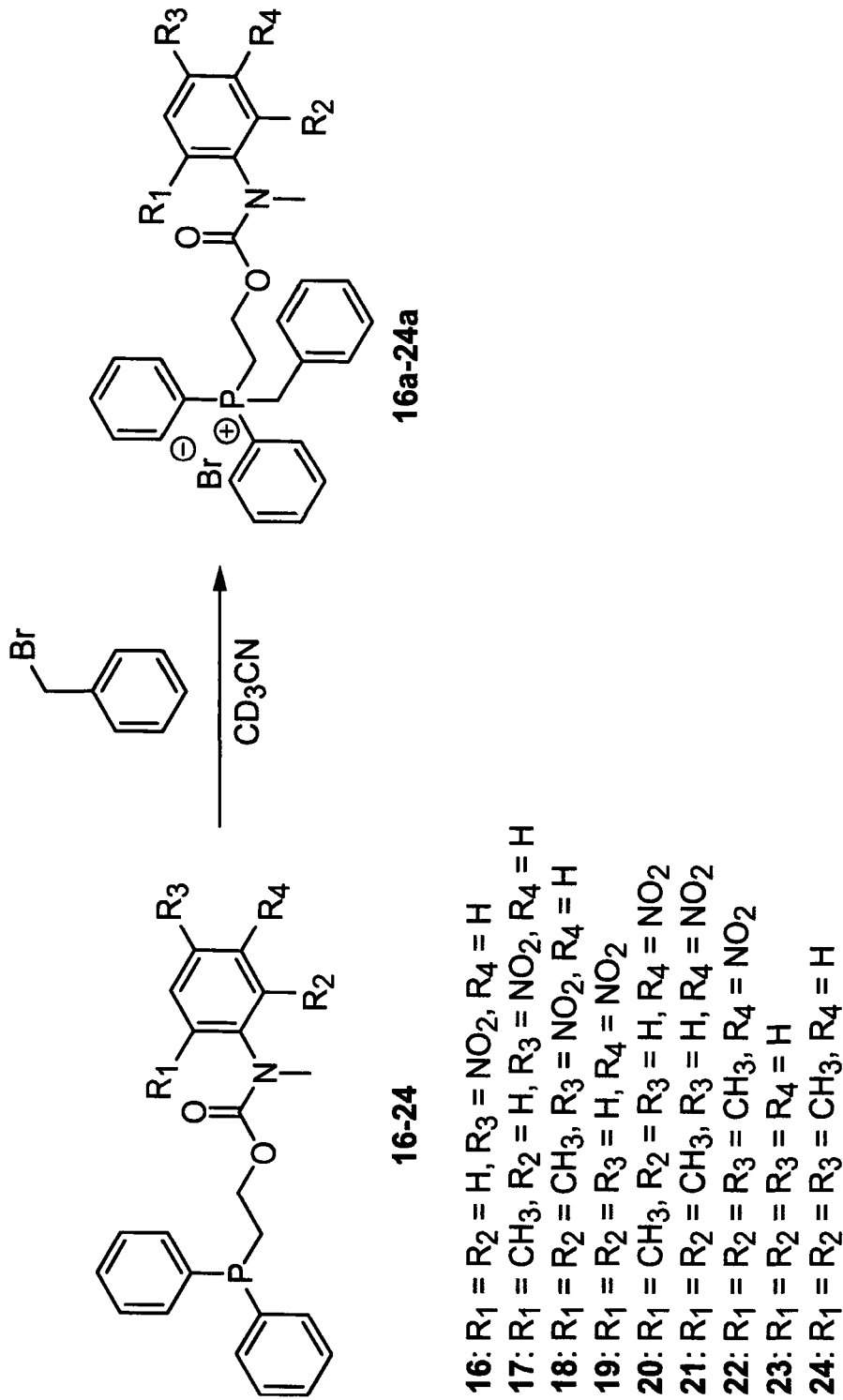
Figure 7:
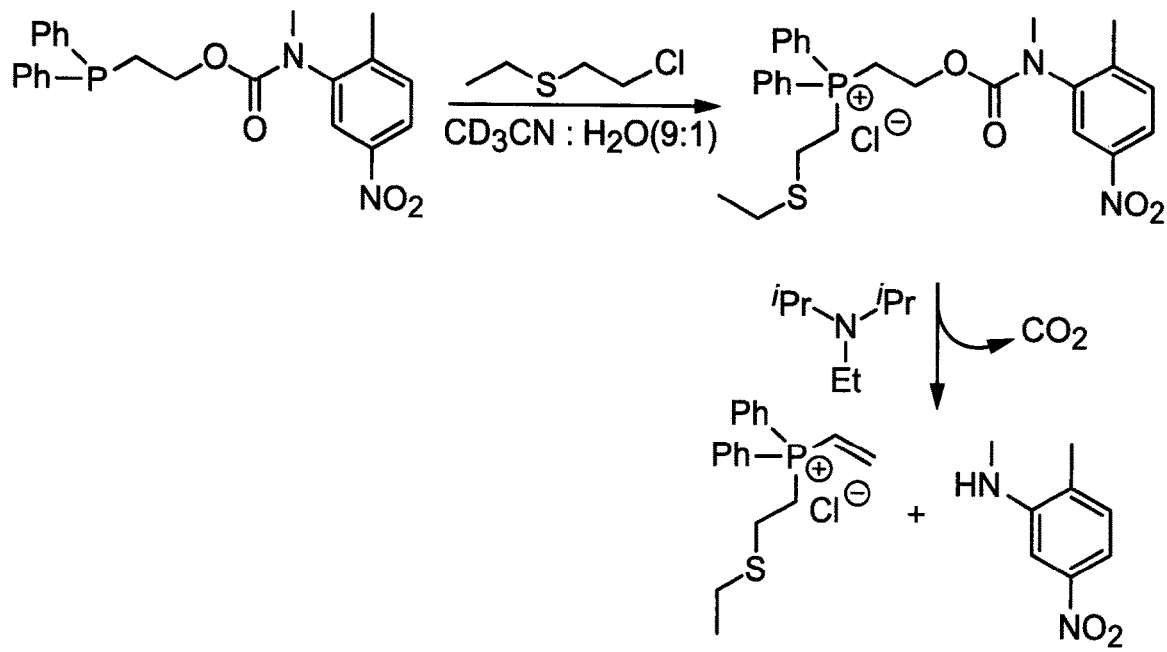
Figure 8:
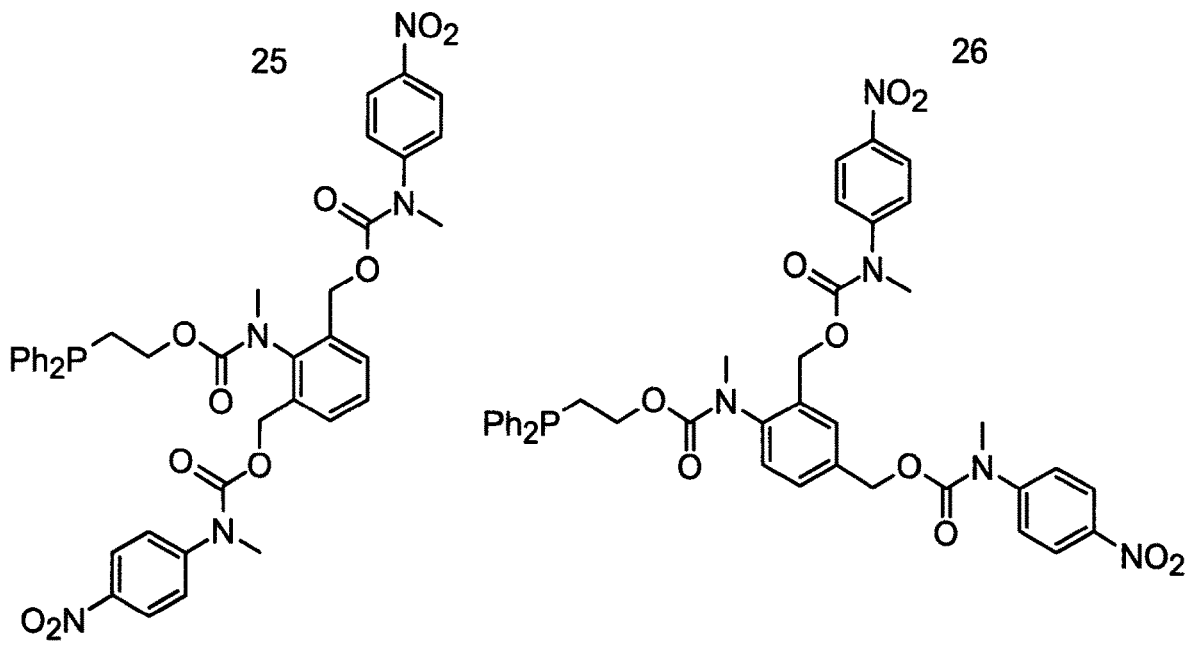
Figure 9:
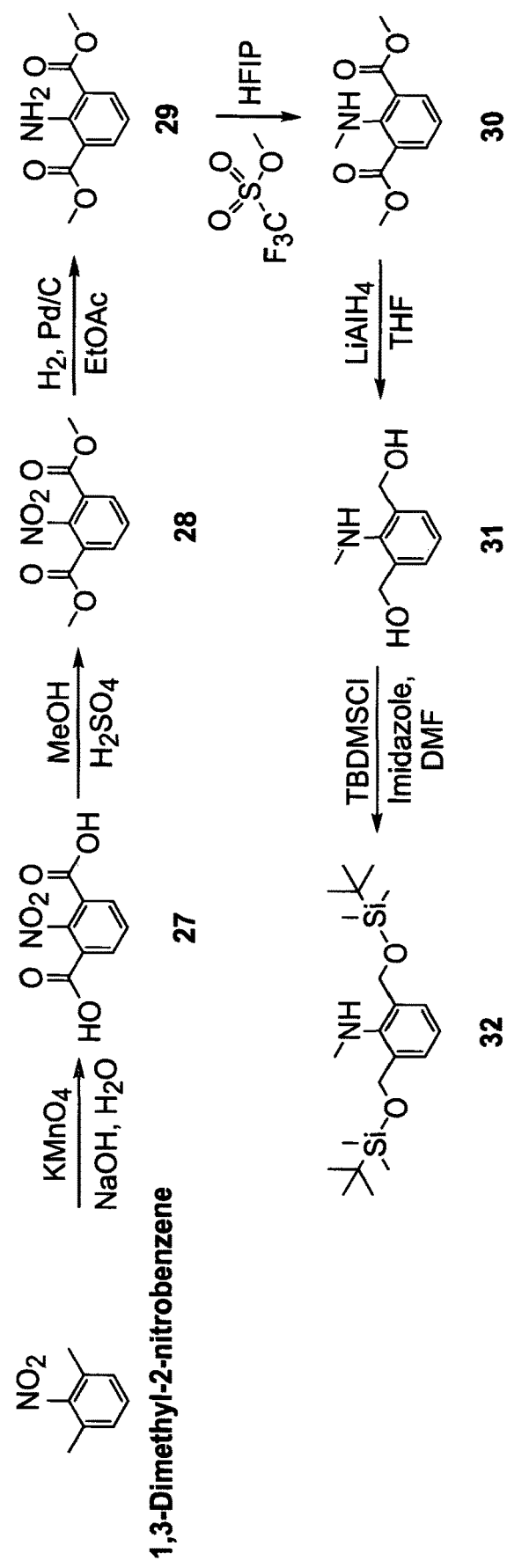
Figure 10:
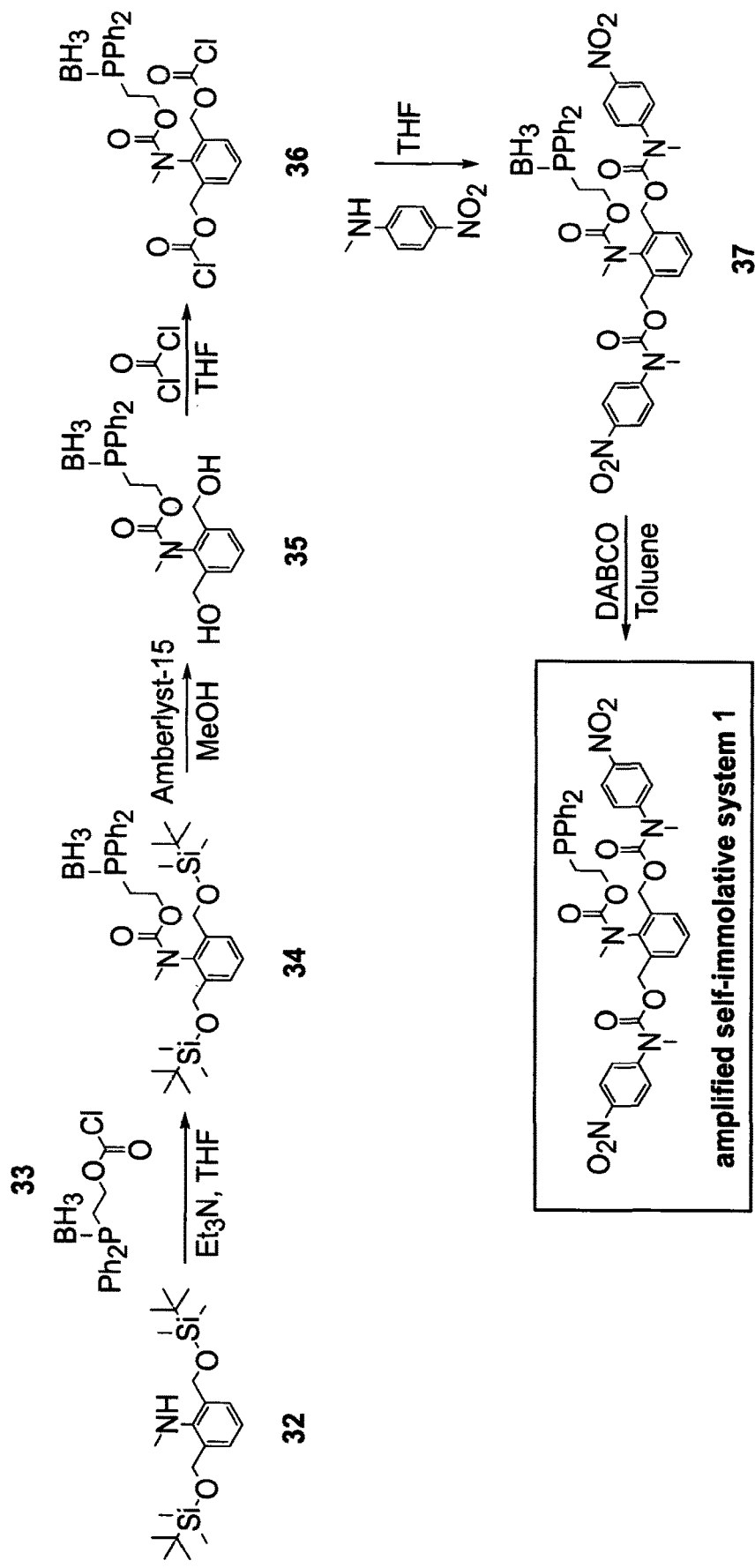
Figure 11:
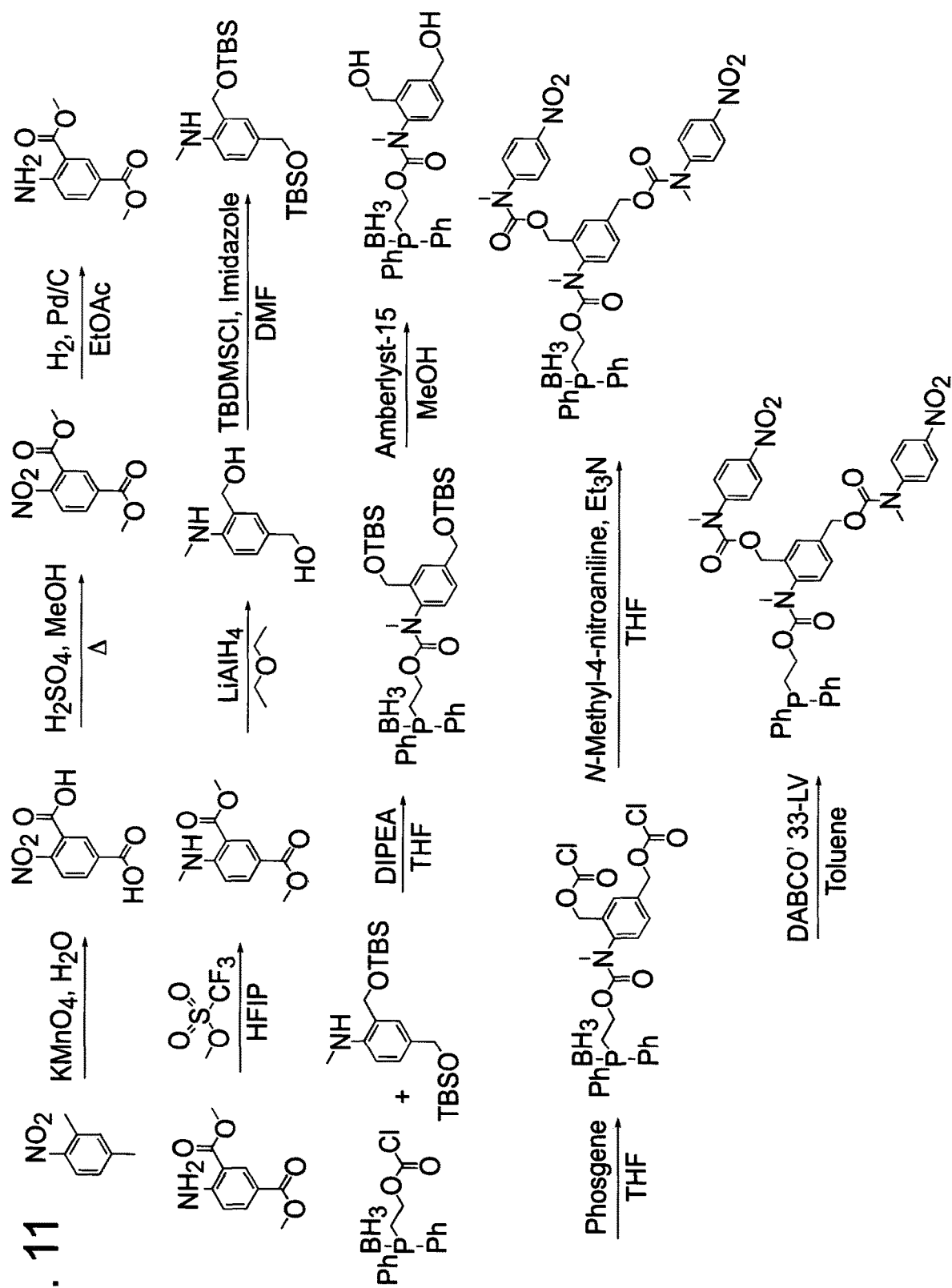
Figure 12:
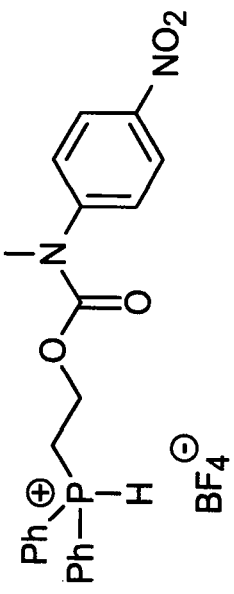
Figure 12:
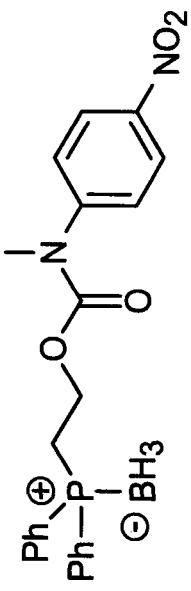
Figure 12:
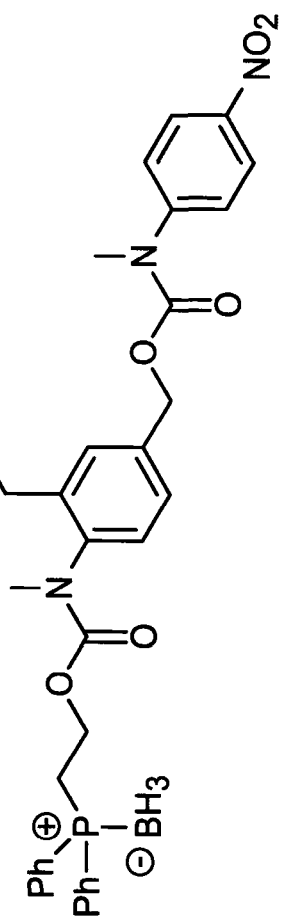
Figure 12:
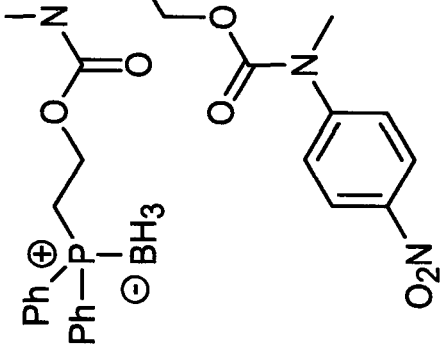
Figure 13:
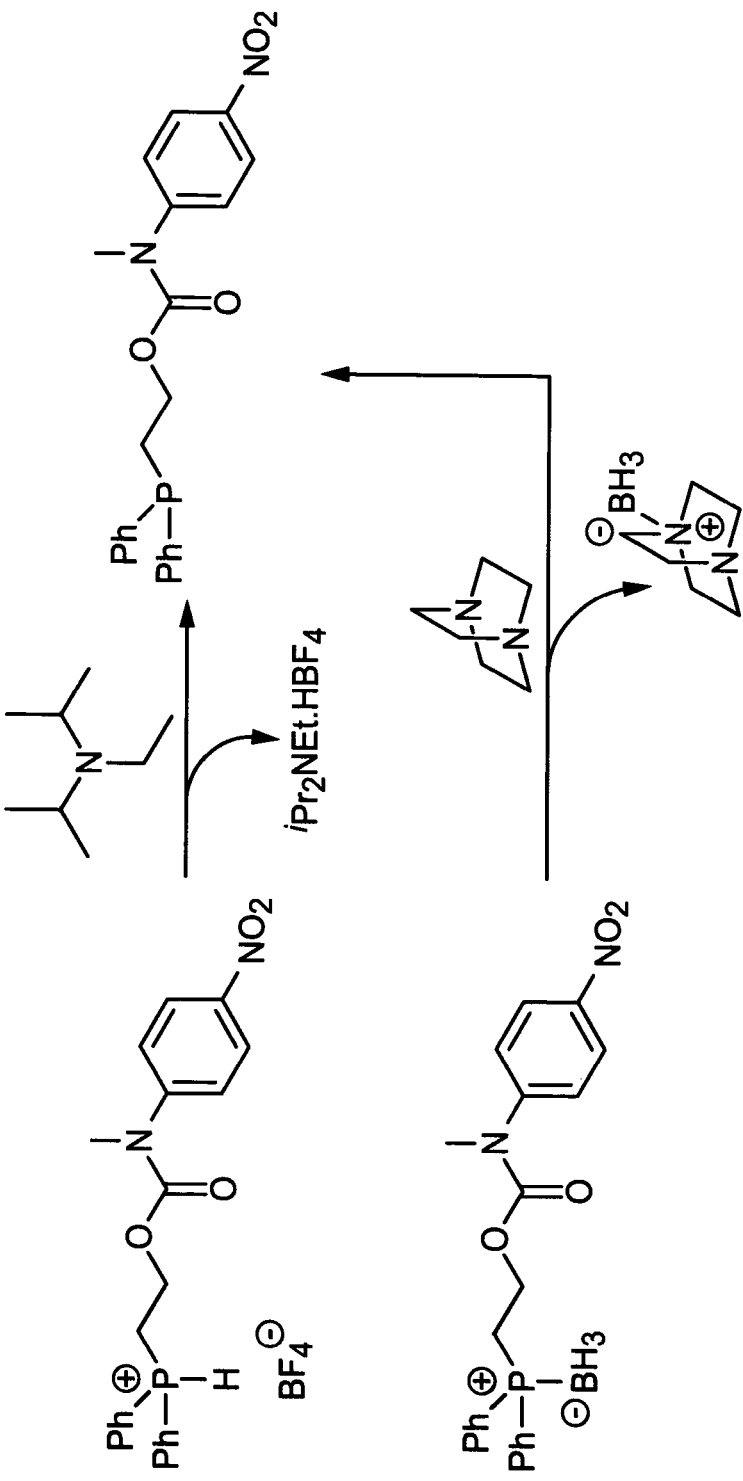
Figure 14:
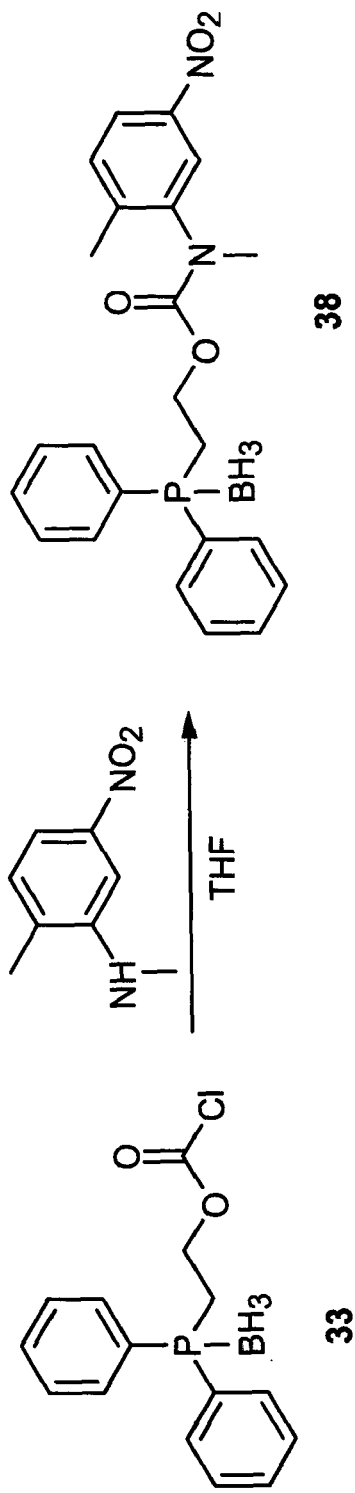
Figure 15:
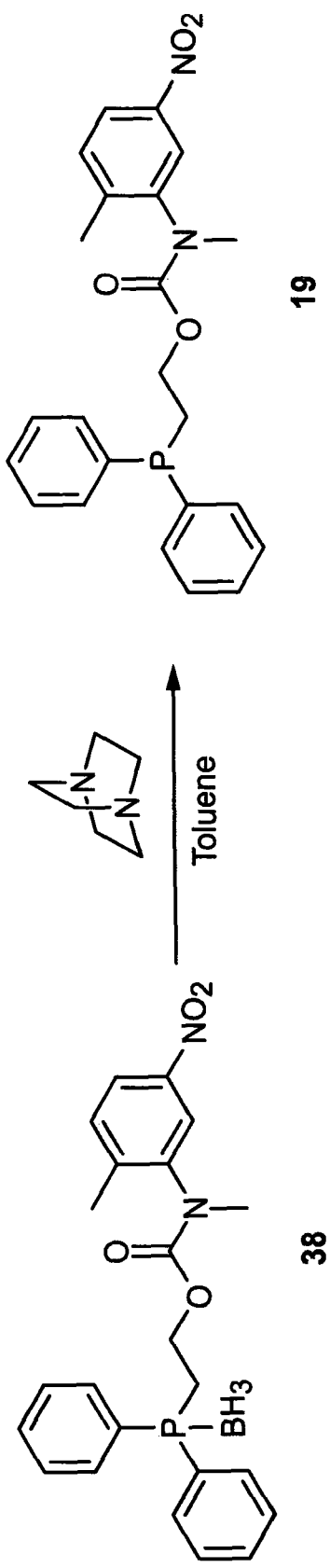

FIG. 5 illustrates the synthesis of self-immolative molecules 16 to 24 from 2-diphenylphosphinoethanol and the N-methyl-carbamoyl chloride derivatives 7 to 15;

FIG. 6 illustrates the alkylation of detection systems 16 to 24 using benzyl bromide as an alkylating agent in $CD_3CN$;

FIG. 7 illustrates the detection of half-mustard (CEES, 2-chloroethyl ethyl sulfide) with self-immolative molecule 20;

FIG. 8 illustrates two self-immolative molecules (25, 26) which both comprise two releasable portions, two N-methyl-4-nitroanilide moieties, and thus a molecule capable of amplifying the colour response signal;

FIGS. 9 and 10 detail the synthetic pathway to generation of self-immolative molecule 25;

FIG. 11 details the synthetic pathway to generation of self-immolative molecule 26;

FIG. 12 illustrates four self-immolative molecules that have enhanced stability for long-term storage. The Applicant has prepared two types of derivative of self-immolative molecules for this purpose: a phosphorous-borane adduct (38, 40, 41) and a protonated phosphine (39);

FIG. 13 illustrates the process by which phosphorous-borane adducts and protonated phosphines may be reconverted to the initial phosphine; and FIGS. 14 and 15 illustrate a two step process by which molecule 38 can be prepared from 33, as an intermediate to synthesis of self-immolative system 19.

EXAMPLES

The present study was concerned with identifying alternative means for detecting chemical warfare agents. One option was to consider self-immolation processes as a means to detect. A key challenge to overcome was that many chemical warfare agents are electrophilic species, whereas the majority of self-immolative systems require a nucleophilic species to trigger the self-immolative cascade required. Thus, the necessity to generate a nucleophile by interaction with a substrate with an electrophile presented an interesting and challenging problem.

The Applicant reports how this challenge has been met by designing a series of potential detector molecules that represent the first examples of selective self-immolative systems triggered by a non-protic electrophilic species, such as alkylating agents, for example alkyl and benzylic halides, as distinct from a proton. The present self-immolative molecules and methods are critically not triggered by protons which has the further key advantage of avoiding false positive results due to protons, which may be present in many samples that could be tested/analysed These systems are capable of providing a visual colorimetric response to such electrophiles, following exposure to a sample in the presence of a mild base, without the need for analytical instrumentation and thus there is great potential for the use of these reagents in the field for the detection of toxic electrophilic compounds such as chemical warfare agents.

The design of the electrophile detection self-immolative system was based on the known, but seldom employed, urethane based protecting group, 2-(methylthio)ethoxycarbonyl (Mteoc). Deprotection of the Mteoc group is traditionally facilitated in two steps via alkylation of the thioether group using methyl iodide ($CH_3I$ or MeI) followed by the addition of base to promote β-elimination and liberation of the protected amine group. The Applicant surmised that the Mteoc group could potentially be used as an electrophile labile trigger group which could be modified and adapted to produce a self-immolative molecule capable of self-disclosing the presence of chemical warfare agents.

Figure 1:
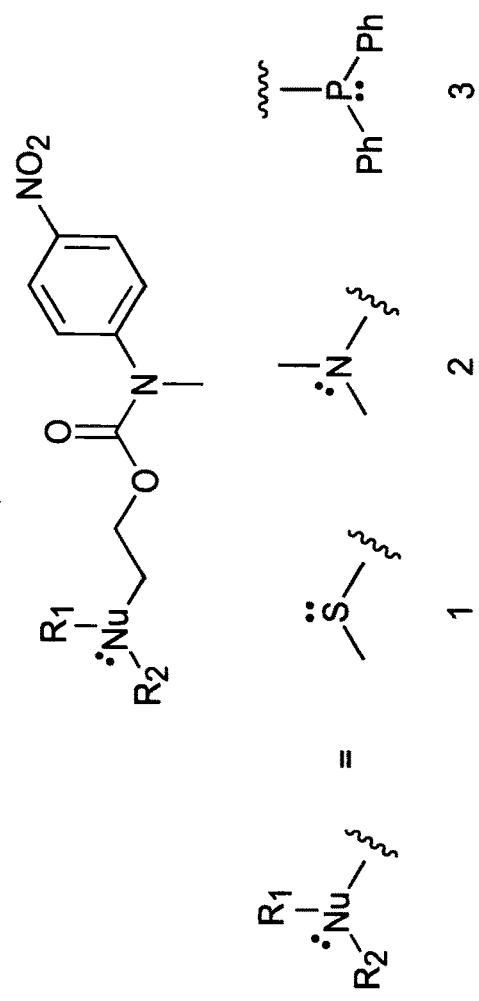

Having regard to FIG. 1, a series of potential molecular disclosure agents were proposed that may upon exposure to an electrophile release a coloured reporter group, for example, N-methyl-4-nitroaniline.

Alkylating agent detection is achieved via alkylation of the trigger group (at the Nu position) leading to an increase in the acidity of the α-protons that under basic conditions result in β-elimination with concomitant self-immolation (decarboxylation) and release of the reporter group. The reporter group, when bound, is colourless but upon release a vibrant visual (yellow) colouration of the detection media would be observed, thereby indicating the presence of the alkylating agent.

The effectiveness of these disclosure systems 1-3 in providing a coloured response, upon exposure to electrophiles, is reliant on their rates of alkylation and β-elimination/self-immolation (decarboxylation). The intent to develop a system that could be deployed in the field, without use of instrumentation, mandated that it should work at room temperature and without need for dry solvents. Thus, three different possible trigger groups were assessed, namely S, N and P-based derivatives (1-3 in FIG. 1), in order to identify which of the trigger groups afforded the optimum balance between the rate of alkylation and subsequent elimination, to release the reporter group, upon exposure to electrophiles/alkylating agents in basic media. The rate of alkylation of nitrogen analogue 2 further served to assess whether it would be possible to use amines as bases in the presence of land 3.

Figure 2:
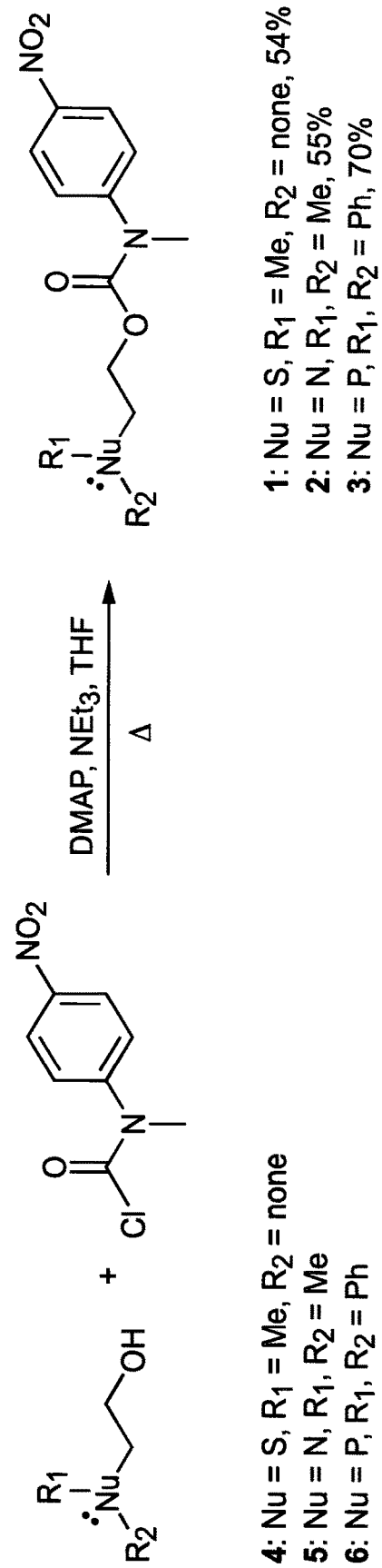
FIG. 2 illustrates the approach to synthesising self-immolative molecules 1 to 3.

Having regard to FIG. 2, the target self-immolative systems were obtained via the conjugation of 2-(methylthio) ethanol 4, 2-dimethylaminoethanol 5 or 2-diphenylphosphinoethanol 6 to N-methyl-N-(4-nitrophenyl)carbamoyl chloride using 4-dimethylaminopyridine (DMAP) as a catalyst and heating under reflux in tetrahydrofuran (THF).

Initial alkylation studies were conducted using a simple alkyl halide (MeU). Cognizant that these are Type II $SN_2$ reactions alkylation of molecules 1-3 was conducted by dissolution of the molecule in the polar aprotic solvent $CD_3CN$, followed by the addition of 10 molar equivalents of MeI, and monitoring the reaction by recording $^1$H-NMR spectra at regular time intervals.

Figure 3A:
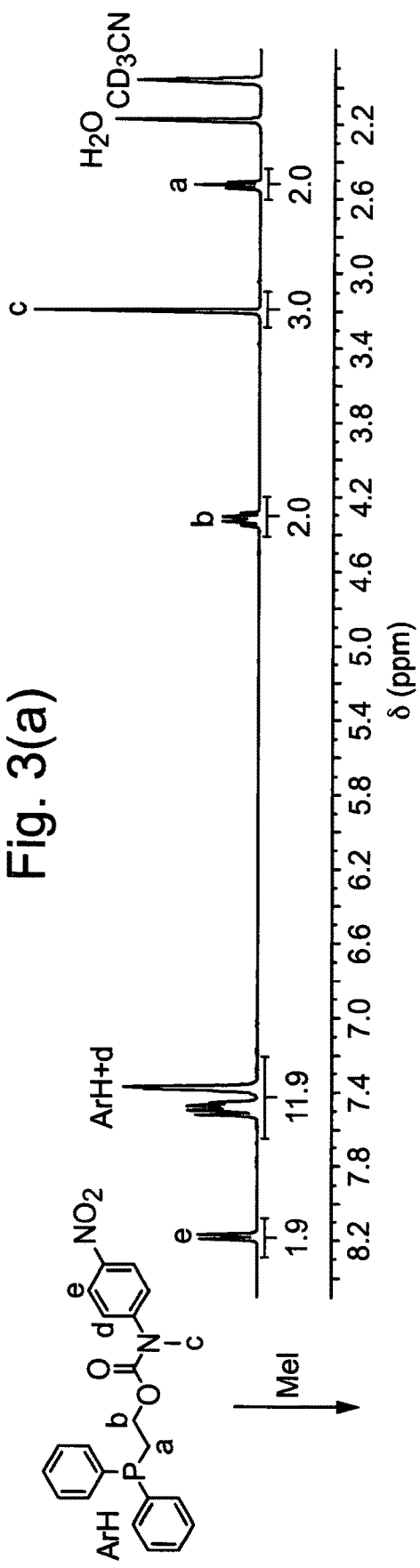
FIG. 3 is $^1$H-NMR spectra of self-immolative molecule 3(a) and subsequent products (b, c) throughout the reaction of 3 with alkylating agent methyl iodide ($CH_3I$)
Figure 3B:
Figure 3C:
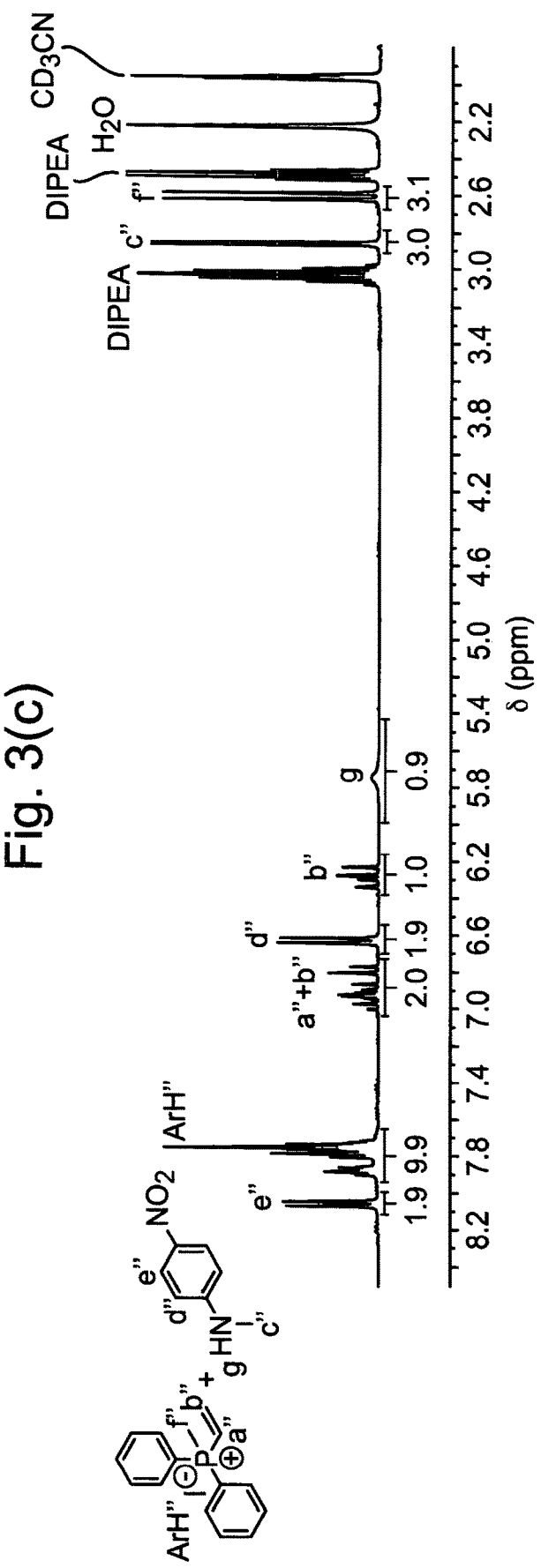

Having regard to FIG. 3, the rate of reaction was monitored using $^1$H-NMR spectra obtained before and after the addition of MeI to a solution of 3 in $CD_3CN$. $^1$H-NMR spectra were obtained (a) before the addition, (b) 20 minutes after the addition of MeI to a solution of 3, and (c) 1080 minutes after addition of DIPEA to a solution of alkylated 3. Analogous experiments were also performed with molecules 1 and 2.

The rate of alkylation was calculated by integration of the singlet resonance at 3.2 ppm corresponding to the N-methyl group of 3 with respect to time. Alkylation was demonstrated to follow pseudo first order kinetics and the half-life ($t_{1/2}$) of alkylation of molecule 3 with MeI was calculated to be 4.6 minutes. The rate of alkylation for molecules 1 and 2 were calculated using the corresponding $^1$H-NMR spectra in an analogous manner and the half-lives of alkylation are shown in Table 1. The methylated products of 1 and 3 undergo elimination when N,N-diisopropylethylamine (DIPEA) is added to release the reporter unit, N-methyl-4-nitroanilinide; their half-lives are recorded in Table 1. The best balance between the rates of alkylation and elimination was achieved with the phosphine based molecule 3.

TABLE 1

Alkylation and elimination rate data obtained following the addition of MeI to molecules 1-3 calculated using $^1$H-NMR spectroscopy.

| Detection system | MeI alkylation $t_{1/2}$ (minutes) | β-Elimination $t_{1/2}$ (minutes) |
|---|---|---|
| 1 | 1994[a] | >900 |
| 2 | 1.4 | None |
| 3 | 4.6 | 120 |

[a]Methyl iodide does not follow pseudo first order kinetics; $t_{1/2}$ is taken as the time taken for 50% of detection system 1 to be alkylated The rates of alkylation and elimination were then investigated using detector 3 with different alkylating agents, as shown in Table 2. The three xylyl bromides detailed in Table 2 have seen historic use as lachrymatory chemical warfare agents (lachrymators). Interestingly, the rates could be increased significantly by nucleophilic catalysis with sodium iodide: a Finkelstein displacement presumably preceding alkylation of detector 3. Only in the case of benzyl chloride did the alkylation prove to be slow and did not follow pseudo first order kinetics.

TABLE 2

Alkylation rate data obtained following the addition of three different xylyl bromides to detector 3 calculated using $^1$H-NMR spectroscopy.

| Alkylating Agent | Alkylation $t_{1/2}$ (minutes) | Alkylation with NaI $t_{1/2}$ (minutes) | β-Elimination $t_{1/2}$ (minutes) |
|---|---|---|---|
| Methyl iodide | 4.6 | — | 120 |
| Benzyl bromide | 14.5 | <5 | 40 |
| Benzyl chloride | >2000 | 24[a] | 1050[b] |
| 2-Methylbenzyl bromide | 4.4 | <5 | 60 |
| 3-Methylbenzyl bromide | 9.5 | <5 | 33 |
| 4-Methylbenzyl bromide | 9.6 | <5 | 47 |

[a] Benzyl chloride does not follow pseudo first order kinetics, $t_{1/2}$ is taken as the time taken for 50% of detection system 3 to alkylate.
[b] Side reaction of N-alkylation with DIPEA occurred, slowing down the rate of β-elimination.

Figure 4:
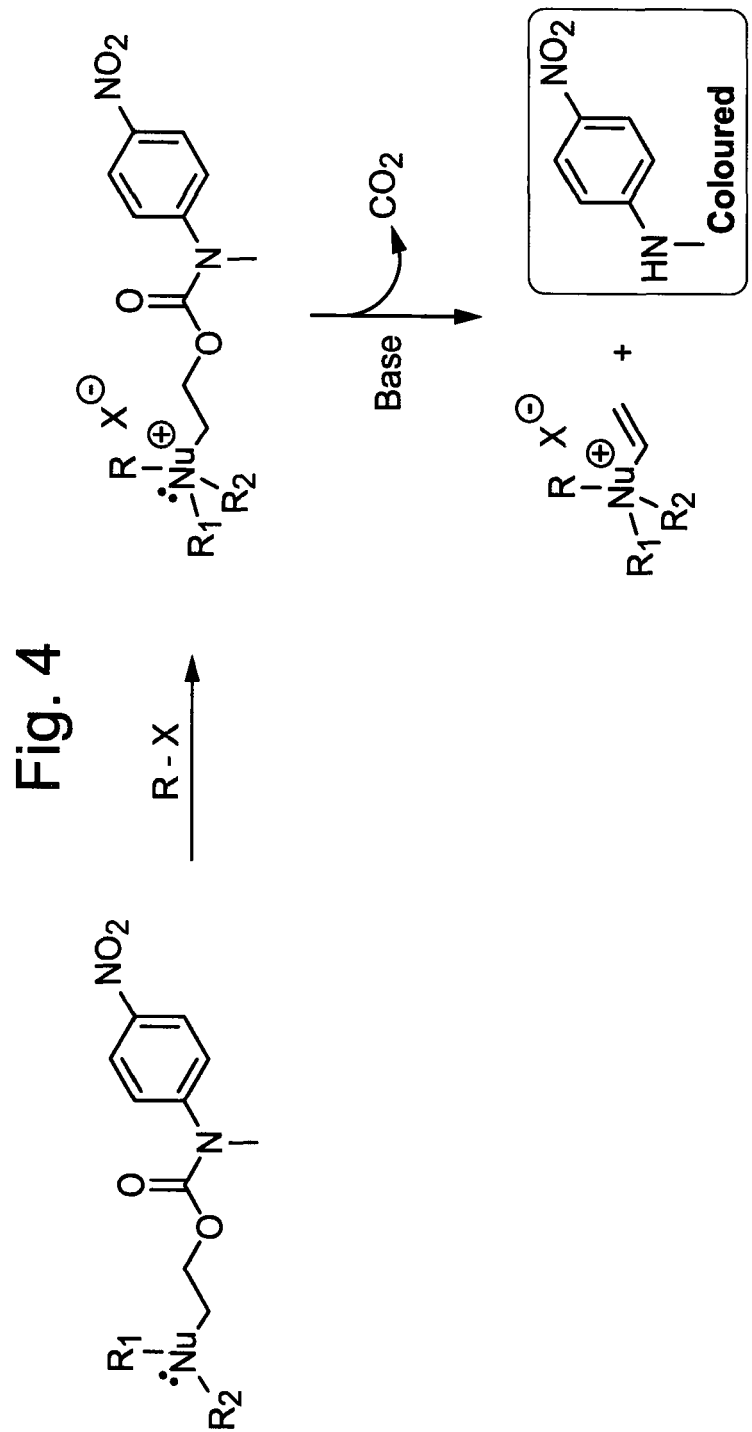
FIG. 4 illustrates the mechanism for releasing the releasable portion, and in this case generating colour, from reaction of an alkylating agent with a self-immolative molecule according to the first aspect of the present invention.

Having regard to FIG. 4, the proposed self-immolative mechanism for the detection of electrophiles/alkylating agents using molecules 1 to 3 is illustrated, wherein Nu is S, N, P, and X is I, Br, Cl.

Detection systems for electrophilic reagents must be capable of being used in the field without generating false positives and thus must be stable to environmental moisture (in this case, to avoid adventitious hydrolysis of the urethane group). Molecule 3 has proved to be successful in the detection of alkylating agents, but its stability in aqueous media required assessment. Therefore, degradation studies were performed using $^1$H-NMR spectroscopy and a solvent mixture of $CD_3CN$ with 10% of $D_2O$. After exposure of molecule 3 to $CD_3CN$ with 10% of $D_2O$, no significant degradation was observed in the $^1$H-NMR spectrum after 20 hours, indicating its potential stability toward environmental moisture.

To obtain an efficient detection system, it is important that all the required reagents can be present simultaneously and that the alkylation, elimination and subsequent self-immolation reactions can occur sequentially whilst avoiding side reactions. Thus, the one-pot reaction of alkylation-elimination-self-immolation was carried out by mixing the molecule 3 with two equivalents of DIPEA before the addition of the alkylating agent. After addition of 10 equivalents of benzyl bromide, the molecule 3 was alkylated and this intermediate then underwent elimination and self-immolation to produce the reporter unit, N-methyl-4-nitroaniline, demonstrating the one-pot alkylation-elimination-self-immolation process. Furthermore, the strong yellow colouration due to the release of N-methyl-4-nitroaniline was observed in significantly less than 10 minutes after addition of the DIPEA.

The Applicant undertook further work to investigate the stability of numerous self-immolative molecules, and in particular the stability of the self-immolative portion. Replacing the N—$CH_3$ group of 3 with sterically larger groups (benzyl and neopentyl) was found to reduce the stability of the self-immolative linker, thus it was decided instead to adjust the electronic and steric properties of the releasable portion (dye unit) to achieve the desired stability. The structure of the N-methyl-p-nitroanilide unit in 3 and the stability of its conjugate base, led to this being considered key to the stability of the linker. The stability of the conjugate base derives from resonating the negative charge around the aromatic ring with the additional resonance into the nitro group being of particular importance in enhancing this effect. Thus, as a first step, it was decided to move the nitro group from the para- to the meta-position on the ring to limit its stabilising effect to induction only. However, moving the nitro group to the meta position was not sufficient to obtain a stable self-immolative molecule (detector). Therefore, a new approach was envisaged, consisting of the introduction of methyl groups in ortho/para positions relative to the carbamate leaving group in the self-immolative molecule. Indeed, the introduction of such groups, especially in ortho position are known to impart a twist on the N—C (aromatic) bond, reducing the ability of the carbamate nitrogen's lone pair to resonate with the ring. This should have two effects: first, the desired reduction in the carbamate's electrophilicity; second, to decrease the leaving character of the carbamate group and consequently increase the stability of these self-immolative molecules. Thus, new self-immolative molecules, substituted by different densities of methyl groups in ortho/para position relative to the carbamate were synthesized. Furthermore, the introduction of methyl groups will not affect its function as a coloured reporter group.

Having regard to FIG. 5, numerous self-immolative molecules were obtained by the previous synthetic route, with the conjugation of 2-diphenylphosphinoethanol to N-methyl-carbamoyl chloride derivatives 7-15 occurring with DMAP as a catalyst and heating under reflux in THF: this afforded self-immolative molecules 16-24 with yields between 35-73%. $^1$H-NMR spectroscopic analysis of the products obtained allowed us to confirm the structure expected for the different self-immolative molecules, as well as their high purity.

The stability of the different self-immolative molecules was then assessed both as a neat liquid and in solution. The stability of the detection systems 16 and 19, bearing a nitro group in para- and meta-position, respectively, was first assessed. Left to stand at room temperature as a neat liquid, under nitrogen (to avoid oxidation of the phosphine unit), 16 and 19 were revealed to be unstable. Under these conditions, more than 20% degradation was observed after 24 h for both self-immolative molecules. Lowering the storage temperature to −20° C. was largely ineffective in alleviating this problem. The absence of reformed 2-diphenylphosphinoethanol suggested that this was not a simple problem of hydrolysis of the molecules. By contrast, when the self-immolative molecules were kept in solution, no degradation was noted after 48 h, as ascertained by $^1$H-NMR spectroscopy.

Detection systems for chemical warfare agents must be capable of being used in the field and thus be stable to environmental moisture. Therefore degradation studies were performed using $^1$H-NMR spectroscopy in a solvent mixture of $CD_3CN$ with 10% of $D_2O$. After exposure of detection systems 16 and 19 to this mixture, no significant degradation was observed after 17 h. Only a slow oxidation of the phosphine unit was observed. This result suggests that the degradation mechanism when neat is bimolecular and involves 16 and 19 reacting with themselves.

In order to increase the stability of the self-immolative molecules, molecules 17, 18 and 20-22, containing one or two methyl groups in ortho/para-position relative to the carbamate group were synthesized. Indeed, the presence of the ortho-methyls on the aromatic ring imparts a twist on the N—C (aromatic) bond (vide infra) reducing the ability of the carbamate nitrogen's lone pair to resonate with the ring. When combined to the electron-donating ability of methyl groups attached to a $sp^2$ carbon, the effect should result in increased resonance of the nitrogen lone pair into the carbamate carbonyl. This should have two effects: first, the desired reduction in the carbamate's electrophilicity; second, to decrease the leaving character of the carbamate group for these self-immolative systems compared to 16 and 19. The stability of these molecules was then assessed both as a neat liquid and in solution. Firstly, at room temperature, under nitrogen, the different self-immolative systems were revealed to be stable with no degradation observed after 48 h in contrast to 16 and 19. These observations show the strong influence of the introduction of the methyl groups in the ortho/para-position relative to the carbamate group on the stability of these self-immolative systems. Furthermore, these detection systems were shown to be stable when kept in solution as previously observed with 16 and 19. The solution degradation studies in the presence of moisture were also performed using $^1$H-NMR spectroscopy in a mixture of $CD_3CN$ and 10% of $D_2O$.

Surprisingly, unlike the detection systems 16 and 19, which were shown to be stable in these conditions, significant degradation was observed with 17, 18, 21 and 22 after a few hours. Only the self-immolative system 20 was shown to be stable both under these conditions and toward itself.

To assess the importance of the nitro group as well as the presence of the methyl groups in the ortho/para-position relative to the carbamate group on the detector stability, the detection systems 23 and 24 were synthesized. As previously, the molecules stability was assessed both as a neat liquid and in solution. At room temperature, under nitrogen, 23 and 24 were revealed to be stable with no degradation observed after 48 h.

The solution degradation studies in a mixture of $CD_3CN$ and 10% of $D_2O$ showed no significant degradation for 23 and 24 after 24 h. By comparing the relative stability toward water of 23 with 16 and 19 as well as the stability of 24 with 17, 18, 21 and 22, the strong influence of the nitro group on the stability of the carbamate group can be established, even when exerting its effect only by induction. However, a good balance seems to be found with the self-immolative system 20, which turned out to be stable toward both moisture and itself.

The rates of alkylation of the different self-immolative systems 16-24 were then investigated. The self-immolative molecule 16 was first tested in the presence of different alkylating agents in $CD_3CN$, as shown in Table 3. Interestingly, the rates could be increased significantly by nucleophilic catalysis with sodium iodide: a Finkelstein displacement presumably preceding alkylation of detector 16. Only in the case of benzyl chloride did the alkylation prove to be slow and does not follow pseudo first order kinetics

TABLE 3

Alkylation rate data obtained following the addition of three different xylyl bromides to self-immolative molecule 16 calculated using $^1$H-NMR spectroscopy.

| Alkylating Agent | Alkylation $t_{1/2}$ (minutes) | Alkylation with NaI $t_{1/2}$ (minutes) |
| --- | --- | --- |
| Methyl iodide | 4.6 | — |
| Benzyl bromide | 14.5 | <5 |
| Benzyl chloride | >2000 | 24* |
| 2-Methylbenzyl bromide | 4.4 | <5 |
| 3-Methylbenzyl bromide | 9.5 | <5 |
| 4-Methylbenzyl bromide | 9.6 | <5 |

*Benzyl chloride does not follow pseudo first order kinetics, $t_{1/2}$ is taken as the time taken for 50% of detection system 16 to alkylate.

Having regard to FIG. 5, the reactivity of systems 17-24 to alkylation was then performed in the presence of benzyl bromide (BnBr) using the same reaction conditions as previously used with the detector 16. Critically, it was found that the introduction of different substituents on the aromatic ring of the dye moiety had no dramatic influence on alkylation rate, with half-life time ($t_{1/2}$) measured between 10.4 and 23.4 minutes (Table 4). In general, a nitro-substituted aromatic is always slower than the corresponding non-nitro compound. Additionally, the presences of ortho-dimethyl aromatics are always a little slower than the equivalent protonated compounds.

TABLE 4

Alkylation rate data obtained following the addition of benzyl bromide to detector 16-24 calculated using $^1$H-NMR spectroscopy.

| Self-immolative molecule | Alkylation $t_{1/2}$ (minutes) |
| --- | --- |
| 16 | 14.5 |
| 17 | 18.0 |
| 18 | 23.4 |
| 19 | 12.3 |
| 20 | 17.5 |
| 21 | 23.1 |
| 22 | 14.9 |
| 23 | 10.4 |
| 24 | 12.3 |

The β-elimination of the resulting alkylated self-immolative molecules, i.e. 16a-24a, was performed using 2 equivalents of N,N-diisopropylethylamine (DIPEA). The degradation of the alkylated detector (self-immolative molecule) 16 was first carried out. The results are shown in Table 5. Self-immolative molecule 16a underwent elimination to produce the reporter unit, N-methyl-4-nitroaniline and $CO_2$. Only in the case arising from alkylation using benzyl chloride in the presence of NaI, was the rate of β-elimination found to be slower due to the side reaction of N-alkylation occurring between the benzyl iodide formed and the DIPEA

TABLE 5

β-elimination rate data obtained following the addition of 2 equivalents of DIPEA to alkylated detector 16 calculated using $^1$H-NMR spectroscopy.

| Alkylating agent used for alkylation | β-Elimination $t_{1/2}$ (minutes) |
| --- | --- |
| Methyl iodide | 120 |
| Benzyl bromide | 40 |
| Benzyl chloride | 1050† |
| 2-Methylbenzyl bromide | 60 |
| 3-Methylbenzyl bromide | 33 |
| 4-Methylbenzyl bromide | 47 |

†Side reaction of N-alkylation with DIPEA occurred, slowing down the rate of β-elimination.

The degradation of the alkylated detectors (self-immolative molecules) 17a-24a (using benzyl bromide as alkylating agent) was then performed. Unlike the alkylation, the rate of elimination dramatically changed with the structure of alkylated self-immolative molecule (Table 6). Indeed, the highest rates were observed when the electron withdrawing nitro group was introduced, lowering the pKa of the conjugate acid of the carbamate leaving group. In analysing the effect of the nitro group it is necessary to consider the relative tendency of the amine nitrogen lone pair to resonate into the aromatic ring versus the carbamate carbonyl.

TABLE 6

β-elimination rate data obtained following the addition of 2 equivalents
of DIPEA to alkylated detector 16a-24a calculated
using $^1$H-NMR spectroscopy.

| Alkylated self-immolative molecule | β-Elimination $t_{1/2}$ (minutes) |
|---|---|
| 16a | 40 |
| 17a | 83 |
| 18a | 480 |
| 19a | 185 |
| 20a | 217 |
| 21a | 1149 |
| 22a | 20% of β-elimination after 24 h |
| 23a | 9% of β-elimination after 24 h |
| 24a | 7% of β-elimination after 24 h |

The highest rate of β-elimination was observed for the detector 16a, containing its nitro group in the para position; this allows a stabilising effect from both resonance and inductive effects (detection system 16a vs. 19a). At the opposite end of the spectrum, the introduction of the ortho-methyl groups led to a decrease of the rate of the reaction. These methyl groups are both modestly electron donating and would be expected to restrict solvation of the leaving group. The geometric effect (C—N bond rotation) can explain the significant decrease of elimination rate of alkylated 18a and 21a, bearing two methyl groups in ortho positions $R_1$ and $R_2$, compared to alkylated 16a and 19a. This effect of the methyl groups in ortho position is supported with intermediate rates observed for 17a (compared to 16a and 18a) and 20a (compared to 19a and 21a), substituted only by one ortho methyl group in position $R_1$.

In view of obtaining an efficient and fast detection system, it is important that the alkylation and elimination reactions can occur with all the reagents in the same vessel, without the presence of side reactions. Thus, the one-pot reaction of alkylation-elimination was carried out by mixing the self-immolative molecule 20 (presenting the best balance in terms of stability toward both water and itself) with 2 equivalents of DIPEA before the addition of the alkylating agent.

After addition of 10 equivalents of benzyl bromide, the detector 20 was alkylated and this intermediate undergoes elimination to produce the reporter unit, N-methyl-2-methyl-3-nitroanilide, demonstrating the one-pot alkylation-elimination process. Furthermore, the yellow colouration due to the release of N-methyl-2-methyl-3-nitroanilide was observed after 5 minutes and strongly 20 minutes after addition of the benzyl bromide.

The influence of the solvent on both alkylation and β-elimination rates was also studied. Concerning the alkylation reactions, it was observed that the rates increased with the solvent polarity, with a value ranging from $t_{1/2}$=65.4 minutes in the least polar solvent $CDCl_3$ to $t_{1/2}$=7 minutes in the most polar mixture $CD_3CN/D_2O$ (9/1), for the self-immolative molecule 16.

The influence of the solvent on both alkylation and β-elimination rates was also studied. The study was carried out using 16 as detector system and benzyl bromide as an alkylating agent. Concerning the alkylation reactions, it was observed that the rates increased with the solvent polarity, with a value ranging from $t_{1/2}$=65.4 minutes in the least polar solvent $CDCl_3$ to $t_{1/2}$=7 minutes in the most polar mixture $CD_3CN/D_2O$ (9/1).

Self-immolative molecule 20 has been reacted with the chemical warfare agent sulfur mustard ($C_4H_8Cl_2S$) in a solvent comprising 1-ethyl-3-methylimidazolium tetrafluoroborate/$H_2O$ (90:10), with molecule 20 being successfully alkylated by the sulfur mustard, illustrating the use of the self-immolative molecules of the first aspect for detection of chemical warfare agents.

Having regard to FIG. 7, Table 7 and Table 8, the Applicant has also detected the presence of half-mustard (CEES, 2-chloroethyl ethyl sulfide), by treating half-mustard with self-immolative molecule 20 in $CD_3CN$:$H_2O$ (9:1), followed by addition of diisopropylethylamine (DIPEA), obtaining the usual yellow colouration from the reporter group.

TABLE 7

Alkylation rate data obtained following the addition of 10 molar
equivalents of CEES to a solution of self-immolative system 20 in
$CD_3CN/D_2O$ 9/1 at 20° C. calculated using $^1$H NMR spectroscopic data

| Alkylation t (minutes) | Alkylated 20 (20a) (%) |
|---|---|
| $t_0$: 0 | 0 |
| $t_1$: 10 | 5 |
| $t_2$: 83 | 21 |
| $t_3$: 1301 | 72 |
| $t_4$: 1627 | 77 |

TABLE 8

Elimination rate data obtained following the addition of 2 molar
equivalents of DIPEA to a solution of alkylated self-immolative system
20a in $CD_3CN/D_2O$ 9/1 at 20° C. calculated using
$^1$H NMR spectroscopic data

| β-elimination t (minutes) | Vinyl phosphonium salt (%) |
|---|---|
| $t_0$: 0 | 0 |
| $t_1$: 10 | 54 |
| $t_2$: 23 | 87 |
| $t_3$: 60 | ≥99 |
| $t_4$: 588 | ≥99 |
| $t_5$: 1348 | ≥99 |

Reported herein are the first examples of selective self-immolative systems that are triggered by non-protic electrophilic species (alkylating agents) such as alkyl and benzylic halides. The self-immolative molecules illustrated herein successfully generate a distinct colorimetric response to non-protic electrophiles following a designed two-step process that involves initial alkylation of the self-immolative unit followed by elimination via an in situ base. These self-immolative molecules offer a practical route for the selective disclosure of electrophilic species, such as chemical warfare agents, in the field without need for instrumentation.

Having regard to FIG. 8, the Applicant has synthesised two self-immolative molecules (25, 26) which both comprise two releasable portions, two N-methyl-4-nitroanilide moieties, and thus a molecule capable of amplifying the colour response signal: two colour moieties to one trigger event triggered by an electrophilic species/compound. Each of these amplification self-immolative molecules has been successful in detecting the presence of benzyl bromide.

Synthesis of (amplification) Self-Immolative
Molecule 25

Having regard to FIGS. 9 and 10, self immolative molecule 25 was synthesised as follows:

KMnO$_4$ (64.3 g, 0.407 mol, 4.0 equiv) was added to a solution of NaOH (13.5 g, 0.338 mol, 3.3 equiv) in water (408 mL) at room temperature. 1,3-Dimethyl-2-nitrobenzene (15.3 g, 0.101 mol, 1.0 equiv) was added and the resulting solution stirred under reflux. The purple colour slowly disappeared as the KMnO$_4$ was reduced and the reaction was continued overnight (12 h). The suspension was cooled to room temperature and filtered. The resulting yellow filtrate was carefully acidified to below pH 2 with concentrated sulfuric acid (96%, 20 mL). The white solid formed was collected by filtration and washed with dichloromethane, ethyl acetate and finally dried in vacuo to afford the pure 2-nitroisophthalic acid 27 as a white powder (11.2 g, 52%). $^1$H NMR (DMSO-d$_6$, 400 MHz) $\delta_H$ 7.82 (1H, t, J=8.0 Hz, ArH), 8.20 (2H, d, J=8.0 Hz, ArH) ppm.

The 2-nitroisophthalic acid 27 (8 g, 0.0376 mol, 1.0 equiv) was diluted in methanol (71 mL) and the resulting solution carefully treated with concentrated sulfuric acid (96%, 7.2 ml, 0.132 mol, 3.5 equiv). The mixture was stirred vigorously under reflux and a large quantity of white solid formed overnight. Half of the methanol was evaporated in vaccuo and the suspension diluted with water (71 mL) to force more solid to precipitate. The solid was isolated by filtration and washed with water (71 mL) before being dissolved in dichloromethane. The solution was dried over anhydrous magnesium sulfate to give the pure dimethyl 2-nitroisophthalate 28 (7.65 g, 84%) as a white powder. $^1$H NMR (CDCl$_3$, 400 MHz) $\delta_H$ 3.92 (6H, s, CH$_3$), 7.66 (1H, t, J=7.6 Hz, ArH), 8.20 (2H, d, J=7.6 Hz, ArH) ppm.

A suspension of dimethyl 2-nitroisophthalate 28 (4 g, 16.73 mmol, 1.0 equiv) and Pd/C (10%, dry, 0.245 g, 0.19 mmol, 1.2 mol %) in ethyl acetate (45 mL) was placed under vacuum, purged with nitrogen, and finally placed under positive pressure of hydrogen at room temperature. Reaction completion was followed by Thin layer chromatography (TLC) analysis. The mixture was filtered. In the case where wet Pd/C was used, the filtrate was first dried over anhydrous sodium sulfate. The solvents were removed under vacuum to give the desired dimethyl 2-amino-1,3-benzenedicarboxylate 29 (3.47 g, 99%) in excellent purity and as a smelly off-white powder. $^1$H NMR (CDCl$_3$, 400 MHz) $\delta_H$ 3.87 (6H, s, CH$_3$), 6.56 (1H, t, J=7.6 Hz, ArH), 8.09 (2H, d, J=7.6 Hz, ArH), 8.14 (2H, s, NH$_2$) ppm.

To a solution of 1,1,1,3,3,3-Hexafluoro-2-propanol (HFIP) (5.0 mL, 50 mmol) and 2-amino-1,3-benzenedicarboxylate 29 (1 g, 4.78 mmol) was added methyl trifluoromethanesulfonate (MeOTf) (0.79 mL, 7.18 mmol). The mixture was stirred for 1 h at room temperature and then quenched by a solution of HCl (2N, 5.0 mL). Volatiles were evaporated under reduced pressure, and the resulting mixture was neutralised with a saturated aqueous solution of NaHCO$_3$ and extracted with CH$_2$Cl$_2$ (3×25 mL). Combined organic phases were dried over MgSO$_4$, filtered and solvent removed under reduced pressure to give the desired product 2-(methylamino)isophthalate 30 (1.04 g, 97%). $^1$H NMR (CDCl$_3$, 400 MHz) $\delta_H$ 2.83 (3H, s, NCH$_3$), 3.88 (6H, s, OCH$_3$), 6.62 (1H, t, J=7.6 Hz, ArH), 7.87 (2H, d, J=7.6 Hz, ArH), 8.29 (1H, s, NH) ppm.

N-Methyl aniline derivative (0.93 g, 4.04 mmol) in THF (10 mL) was added dropwise to cooled (0° C.) lithium aluminium hydride (0.61 g, 16.1 mmol) in THF (20 mL). After the mixture had been stirred at room temperature overnight, the reaction was quenched by the dropwise addition of cold water, and 50 mL of diethyl ether was added. The salts formed were filtrated and washed with diethyl ether (4×100 mL). The solvents were removed under vacuum and the residue obtained was diluted in dichloromethane, dried over Mg$_2$SO$_4$ and the solvent was removed in vacuo, affording the desired compound (2-(methylamino)-1,3-phenylene)dimethanol 31 as a pale yellow solid (0.58 g, 83%). $^1$H NMR (CDCl$_3$, 400 MHz) $\delta_H$ 2.77 (3H, s, NCH$_3$), 3.86 (3H, br. s, NH+OH) 4.69 (6H, s, OCH$_2$), 6.96 (1H, t, J=7.6 Hz, ArH), 7.13 (2H, d, J=7.6 Hz, ArH) ppm.

(2-(methylamino)-1,3-phenylene)dimethanol 31 (0.40 g, 2.4 mmol) was dissolved in DMF (3 mL) and cooled to 0° C. Imidazol (0.392 g, 5.76 mmol) and tert-Butyldimethylsilyl chloride (TBDMSCl) (0.868 g, 5.76 mmol) were added. The reaction was stirred at room temperature overnight. The reaction was then diluted with ether and washed with a saturated solution of NH$_4$Cl. The organic layer was dried over Mg$_2$SO$_4$ and the solvent was removed under reduced pressure. The crude product was purified by column chromatography on silica gel (EtOAc:n-hexane 5:95) to give the desired compound 2,6-bis(((tert-butyldimethylsilyl)oxy)methyl)-N-methylaniline 32 (0.71 g, 80%). $^1$H NMR (CDCl$_3$, 400 MHz) $\delta_H$ 0.07 (12H, s, SiCH$_3$), 0.92 (18H, s, SiCCH$_3$), 2.78 (3H, s, NCH$_3$), 4.25 (1H, s, NH), 4.74 (4H, s, OCH$_2$), 6.93 (1H, t, J=7.6 Hz, ArH), 7.27 (2H, d, J=7.6 Hz, ArH) ppm.

To a solution of borane diphenylphosphine complex (1.07 g, 5.37 mmol) and 2-bromoethanol (0.671 g, 5.37 mmol) in THF (20 mL) was added n-butyl lithium (7.1 mL, 1.6 M in hexanes). The mixture was stirred for 6 h at 0° C. The THF was evaporated and the residue extracted in EtOAc (2×20 mL). The resulting solution was dried over Mg$_2$SO$_4$ and the solution evaporated. The crude product was purified via column chromatography (n-hexane/EtOAc 7/3) to yield the product borane 2-(diphenylphosphino)ethanol complex (0.800 g, 61%) as a white solid. $^3$H NMR (CDCl$_3$, 400 MHz) $\delta_H$ 1.05 (3H, br. q, BH$_3$), 2.26 (1H, s, OH), 2.56 (2H, dt, J=6.4 Hz, J=10.8 Hz, CH$_2$P), 3.90 (2H, dt, J=6.0 Hz, J=14.8 Hz, CH$_2$O), 7.47-7.65 (6H, m, ArH), 7.69 (4H, t, J=6.0 Hz, ArH) ppm. $^{31}$P NMR (CDCl$_3$, 162 MHz) $\delta_P$ 11.5 (br.) ppm. Borane 2-(diphenylphosphino)ethanol complex (0.300 g, 1.23 mmol, 1.0 equiv) was dissolved in THF (V=4.5 mL). The resulting solution was then added dropwise into a phosgene solution (15 wt % in toluene, 1.76 mL, 2.46 mmol, 2.0 equiv) under an argon atmosphere at 0° C., and the resulting solution was then stirred for 24 h at room temperature. The residual phosgene and solvent were then removed by distillation in vacuo to yield borane 2-(diphenylphosphino)ethyl chloroformate complex 33 (0.339 g, 90%) as a thick oil. $^1$H NMR (CDCl$_3$, 400 MHz) $\delta_H$ 1.00 (3H, br. q, BH$_3$), 2.72 (2H, dt, J=8.0 Hz, J=11.2 Hz, CH$_2$P), 4.53 (2H, dt, J=8.0 Hz, J=8.0 Hz, CH$_2$O), 7.49-7.65 (6H, m, ArH), 7.70 (4H, t, J=8.0 Hz, ArH) ppm. $^{31}$P NMR (CDCl$_3$, 162 MHz) $\delta_P$ 12.1 (br.) ppm.

To a solution of Borane 2-(diphenylphosphino)ethyl chloroformate complex 33 (0.261 g, 0.852 mmol) in THF (3 mL) was added dropwise a solution of 2,6-bis(((tert-butyldimethylsilyl)oxy)methyl)-N-methylaniline 32 (0.280 g, 0.71 mmol), 4-dimethylaminopyridine (0.0087 g, 0.071 mmol) and triethylamine (0.2 mL, 1.42 mmol) (previously dissolved in 6 mL of THF) under an argon atmosphere at 0° C. The mixture was then stirred at room temperature overnight. The precipitate formed was then filtered and the solvent removed in vacuo. The crude product was purified by column chromatography on silica gel (THF:n-hexane 5:95) to afford the borane 2-(diphenylphosphino)ethyl (2,6-bis((((tert-butyldimethylsilyl)oxy)methyl)phenyl)(methyl)carbamate complex 34 as a white solid (0.331 g, 70%) with a 76:24 mixture of rotamers A:B. $^1$H NMR (CDCl$_3$, 400 MHz) $\delta_H$ 0.08 (12H, m, SiCH$_3$, rotamer A+rotamer B), 0.92 (21H: s, SiCCH$_3$ and br. m, BH$_3$ rotamer A+rotamer B), 2.51 (2H, m, CH$_2$P, rotamer A), 2.72 (2H, m, CH$_2$P, rotamer A), 2.93 (3H, m, CH$_3$N, rotamer B), 3.14 (3H, m, CH$_3$N, rotamer A), 4.20 (2H, m, CH$_2$O, rotamer A), 4.43 (2H, m, CH$_2$O, rotamer B), 4.60 (2H, m, CH$_2$O, rotamer A+rotamer B), 7.37 (1H, m, ArH, rotamer A+rotamer B), 7.45 (8H, m, ArH, rotamer A+rotamer B), 7.66 (4H, m, ArH, rotamer A), 7.74 (4H, m, ArH, rotamer B) ppm. $^{31}$P NMR (CDCl$_3$, 162 MHz) $\delta_P$ 11.6 (br.) ppm.

Borane 2-(diphenylphosphino)ethyl (2,6-bis(((tert-butyldimethylsilyl)oxy)methyl)phenyl)(methyl)carbamate complex 34 (0.300 g, 0.451 mmol) was dissolved in 45 ml methanol and amberlyst-15 was added. The reaction was stirred at room temperature for 2 hours and was monitored by TLC (EtOAc:n-hexane 10:90). After completion the amberlyst-15 was filtered out and the solvent was removed under reduced pressure. The crude product was further purified by column chromatography on silica gel (EtOAc:n-hexane 70:30) to afford borane 2-(diphenylphosphino)ethyl (2,6-bis(hydroxymethyl)phenyl)(methyl)carbamate complex 35 as a white solid (0.142 g, 72%) with a 50:50 mixture of rotamers A:B. $^1$H NMR (DMSO-d$_6$, 400 MHz) $\delta_H$ 0.89 (3H, br. m, BH$_3$ rotamer A+rotamer B), 2.59 (3H, s, CH$_3$N, rotamer B), 2.61 (2H, m, CH$_2$P, rotamer A), 2.72 (2H, m, CH$_2$P, rotamer A), 3.02 (3H, m, CH$_3$N, rotamer A), 3.99 (2H, m, CH$_2$O, rotamer A), 4.26-4.44 (2H, m, CH$_2$O, rotamer B, 4H, m, CH$_2$OH, rotamer A+rotamer B), 5.14 (2H, m, OH, rotamer A+rotamer B), 7.33 (1H, m, ArH, rotamer A+rotamer B), 7.38 (2H, m, ArH, rotamer A+rotamer B), 7.46-7.62 (8H, m, ArH, rotamer A+rotamer B), 7.68 (4H, m, ArH, rotamer A), 7.80 (4H, m, ArH, rotamer B), $^{31}$P NMR (DMSO-d$_6$, 162 MHz) $\delta_P$ 10.75 (rotamer A), 12.46 (rotamer B) ppm.

Borane 2-(diphenylphosphino)ethyl (2,6-bis(hydroxymethyl)phenyl)(methyl)carbamate complex 35 (0.100 g, 0.229 mmol, 1.0 equiv) was dissolved in THF (V=0.84 mL). The resulting solution was then added dropwise into a phosgene solution (15 wt % in toluene, 0.33 mL, 0.458 mmol, 2.0 equiv) under an argon atmosphere at 0° C., and the resulting solution was then stirred for 24 h at room temperature. The residual phosgene and solvent were then removed by distillation in vacuo to yield borane (2-(((2-(diphenylphosphino)ethoxy)carbonyl)(methyl)amino)-1,3-phenylene)bis (methylene) bis(chloroformate) complex 36 (0.115 g, 89%) as a thick oil with a 61:39 mixture of rotamers A:B. $^1$H NMR (CDCl$_3$, 400 MHz) $\delta_H$ 1.00 (3H, br. m, BH$_3$), 2.53 (2H, m, CH$_2$P, rotamer A), 2.75 (2H, m, CH$_2$P, rotamer B), 2.97 (3H, s, CH$_3$N, rotamer B), 3.21 (3H, m, CH$_3$N, rotamer A), 4.24 (2H, m, CH$_2$OCON, rotamer A), 4.47 (2H, m, CH$_2$OCON, rotamer B), 5.19 (2H, m, CH$_2$OCOCl, rotamer A+rotamer B), 7.39-7.58 (9H, m, ArH, rotamer A+rotamer B), 7.65 (4H, m, ArH, rotamer A), 7.74 (4H, m, ArH, rotamer B) ppm. $^{31}$P NMR (CDCl$_3$, 162 MHz) $\delta_P$ 11.81 (br.) ppm.

To a solution of borane (2-(((2-(diphenylphosphino)ethoxy)carbonyl)(methyl)amino)-1,3-phenylene)bis(methylene) bis(chloroformate) complex 36 (0.100 g, 0.178 mmol, 1.0 equiv) in THF (0.7 mL) was added dropwise a solution of N-methyl-4-nitroaniline (0.081 g, 0.534 mmol, 3.0 equiv) (previously dissolved in 0.3 mL of THF) under an argon atmosphere at 0° C. The mixture was stirred at room temperature overnight. Triethylamine (Et$_3$N) (0.025 mL, 0.178 mmol, 1.5 equiv) was added and the solvent removed in vacuo. The crude product was purified by column chromatography on silica gel (CH$_2$Cl$_2$/n-hexane 1:1→n-hexane/EtOAc 6/4) to afford the borane 2-(((2-(diphenylphosphino)ethoxy)carbonyl)(methyl)amino)-3-(((methyl(4-nitrophenyl)carbamoyl)oxy)methyl)benzyl (4-nitrophenyl)-$\lambda^2$-azanecarboxylate complex 37 as a foamy white solid (0.112 g, 79%) with a 58:42 mixture of rotamers A:B. $^1$H NMR (CDCl$_3$, 400 MHz) $\delta_H$ 0.95 (3H, br. m, BH$_3$), 2.53 (2H, m, CH$_2$P, rotamer A), 2.70 (2H, m, CH$_2$P, rotamer B), 2.89 (3H, s, CH$_3$N, rotamer B), 3.12 (3H, s, CH$_3$N, rotamer A), 3.37 (6H, m, CH$_3$N, rotamer A+rotamer B), 4.15 (2H, m, CH$_2$O, rotamer A), 4.39 (2H, m, CH$_2$O, rotamer B), 5.11 (4H, m, CH$_2$O, rotamer A+rotamer B), 7.31-7.54 (13H, m, ArH, rotamer A+rotamer B), 7.64 (4H, m, ArH, rotamer A), 7.71 (4H, m, ArH, rotamer B), 8.18 (4H, d, J=8.8 Hz, ArH, rotamer A+rotamer B) ppm. $^{31}$P NMR (CDCl$_3$, 162 MHz) $\delta_P$ 11.12 (rotamer A), 12.40 (rotamer B) ppm.

The borane 2-(((2-(diphenylphosphino)ethoxy)carbonyl)(methyl)amino)-3-((((methyl(4-nitrophenyl)carbamoyl)oxy)methyl)benzyl (4-nitrophenyl)-$\lambda^2$-azanecarboxylate complex 37 (0.100 g, 0.126 mmol) was added to a flask and flushed with nitrogen. Anhydrous toluene (V=0.95 mL) was added and the solution stirred at 30° C. In a separate vial, a solution of Dabco® 33-LV (0.071 g) in anhydrous toluene (V=0.31 mL) was prepared and then added in one portion into the flask containing the borane complex solution. The reaction mixture was stirred to 30° C. for 18 h under inert atmosphere. The reaction mixture was then cooled to room temperature and the toluene evaporated under vacuum. The crude product was purified by column chromatography on silica gel (n-hexane/EtOAc 7/3) to afford the 2-(((2-(diphenylphosphino)ethoxy)carbonyl)(methyl)amino)-3-(((methyl(4-nitrophenyl)carbamoyl)oxy)methyl)benzyl (4-nitrophenyl)-$\lambda^2$-azanecarboxylate: Amplified self-immolative system 25 as a foamy white solid (0.088 g, 90%) with a 61:49 mixture of rotamers A:B. $^1$H NMR (CDCl$_3$, 400 MHz) $\delta_H$ 2.25 (2H, m, CH$_2$P, rotamer A), 2.49 (2H, m, CH$_2$P, rotamer B), 3.02 (3H, s, CH$_3$N, rotamer B), 3.14 (3H, s, CH$_3$N, rotamer A), 3.36 (6H, m, CH$_3$N, rotamer A+rotamer B), 4.07 (2H, m, CH$_2$O, rotamer A), 4.27 (2H, m, CH$_2$O, rotamer B), 5.17 (4H, m, CH$_2$O, rotamer A+rotamer B), 7.21-7.54 (17H, m, ArH, rotamer A+rotamer B), 8.18 (4H, d, J=8.8 Hz, ArH, rotamer A+rotamer B) ppm. $^{31}$P NMR (CDCl$_3$, 162 MHz) $\delta_P$ −23.61 (rotamer A), −22.73 (rotamer B) ppm.

Alkylation Reaction $^1$H NMR spectroscopic studies were conducted by dissolution of the amplified self-immolative system 25 in a mixture of CD$_3$CN/D$_2$O (9/1: V/V) (V$_{Total}$=0.5 mL, [25]=0.025 mol·L$^{-1}$), followed by the addition of 1 molar equivalents of the benzyl bromide directly to the NMR tube.

β-Elimination Reaction $^1$H NMR spectroscopic studies were conducted by addition of 2 molar equivalents of N,N-diidopropylethylamine (DIPEA) of the corresponding alkylated amplified self-immolative system 25 directly to the NMR tube.

The $^1$H-NMR studies indicated significant alkylation and β-elimination to have occurred after 90 minutes.

Having regard to FIG. 11, self-immolative molecule 26 was also synthesised through a similar route to that for self-immolative molecule 25.

Having regard to FIG. 12, to further enhance the stability of the self-immolative molecules towards long-term storage, the Applicant has prepared two types of derivative, a phosphorous-borane adduct (for example, 38, 40, 41) and a protonated phosphine (for example: 39). Each of these prevents oxidation of the phosphine to the corresponding phosphine oxide and is stable to storage. Having regard to FIG. 13, both of these classes of compound can be reconverted to the initial phosphine when needed.

For example, the self-immolative system 19 (0.083 g, 0.203 mmol, 1 eq.) was added to a flask which was then flushed with nitrogen. Freshly distilled dichloromethane (V=4 mL) was added and the solution stirred at room temperature. HBF$_4$.Et$_2$O was added (V=0.06 mL, 2 eq. HBF$_4$) to the solution of 19 and the reaction mixture was stirred to room temperature for 12 h under inert atmosphere. The solvents were evaporated under vacuum and the protonated self-immolative system 39 was collected by precipitation into a mixture of 1/1 n-hexane/Et$_2$O from solution in the minimum amount of dichloromethane. After drying in vacuo, protonated self-immolative system 39 was obtained as a sticky solid (0.065 g, 78% yield).

Alternatively, and having regard to FIGS. 14 and 15, 38 can be prepared from 33, as an intermediate to synthesis of self-immolative system 19:

To a solution of borane 2-(diphenylphosphino)ethyl chloroformate complex 33 (0.500 g, 1.63 mmol, 1 equiv) in THF (2 mL) was added dropwise a solution of N,2-dimethyl-5-nitroaniline (0.406 g, 2.45 mmol, 1.5 equiv) (previously dissolved in 4 mL of THF) under an argon atmosphere at 0° C. The mixture was then stirred at room temperature overnight. Triethylamine (Et$_3$N) (0.23 mL, 1.63 mmol, 1 equiv) was added and the solvent removed in vacuo. The crude product was purified by column chromatography on silica gel (CH$_2$Cl$_2$/n-hexane 1:1->n-hexane/EtOAc 7/3) to afford the borane 2-(diphenylphosphino)ethyl methyl(2-methyl-5-nitrophenyl)carbamate complex 38 as a white solid (0.576 g, 81%) with a 59:41 mixture of rotamers A:B. $^1$H NMR (CDCl$_3$, 400 MHz) $\delta_H$ 1.00 (3H, br. m, BH$_3$), 2.27 (3H, s, CH$_3$Ar, rotamer A+rotamer B), 2.44-2.88 (2H, m, CH$_2$P, rotamer A+rotamer B), 2.92 (3H, s, CH$_3$N, rotamer B), 3.20 (3H, s, CH$_3$N, rotamer A), 4.27 (2H, m, CH$_2$O, rotamer A), 4.51 (2H, m, CH$_2$O, rotamer B), 7.34-7.58 (7H, m, ArH, rotamer A+rotamer B), 7.57-7.82 (4H, m, ArH, rotamer A+rotamer B), 7.86 (1H, s, ArH, rotamer A), 7.94 (1H, s, ArH, rotamer B), 8.06 (1H, d, J=8.8 Hz, ArH, rotamer A+rotamer B) ppm. $^{31}$P NMR (CDCl$_3$, 162 MHz) $\delta_P$ 12.10 (rotamer A+rotamer B) ppm.

The borane 2-(diphenylphosphino)ethyl chloroformate complex 38 (0.502 g, 1.15 mmol) was added to a flask which was then flushed with nitrogen. Anhydrous toluene (V=8.6 mL) was added and the solution stirred at 30° C. In a separate vial, a solution of Dabco® 33-LV (0.643 g) in anhydrous toluene (V=2.9 mL) was prepared and then added in one portion into the flask containing the borane complex solution. The reaction mixture was stirred to 30° C. for 18 h under inert atmosphere. The reaction mixture was then cooled to room temperature and the toluene evaporated under vacuum. The crude product was purified by column chromatography on silica gel (n-hexane/EtOAc 8/2) to afford the 2-(diphenylphosphino)ethyl methyl(2-methyl-5-nitrophenyl)carbamate 19 as a colourless oil (0.437 g, 90%) with a 66:34 mixture of rotamers A:B. $^1$H NMR (CDCl$_3$, 400 MHz) $\delta_H$ 2.30 (3H, s, CH$_3$Ar, rotamer A+rotamer B, 2H, m, CH$_2$P, rotamer A), 2.54 (2H, m, CH$_2$P, rotamer B), 3.06 (3H, s, CH$_3$N, rotamer B), 3.21 (3H, s, CH$_3$N, rotamer A), 4.19 (2H, m, CH$_2$O, rotamer A), 4.38 (2H, m, CH$_2$O, rotamer B), 7.22-7.62 (11H, m, ArH, rotamer A+rotamer B), 7.95 (1H, s, ArH, rotamer A), 8.00 (1H, s, ArH, rotamer B), 8.05 (1H, d, J=8.4 Hz, ArH, rotamer A+rotamer B) ppm. $^{31}$P NMR (CDCl$_3$, 162 MHz) $\delta_P$ −23.10 (rotamer A), −21.85 (rotamer B) ppm.

The invention claimed is:

1. A self-immolative molecule suitable to be triggered by non-protic electrophilic agents, having structural formula:

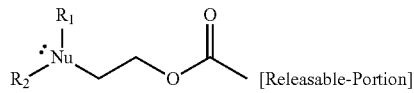

wherein Nu is phosphorus (P), $R_1$ and $R_2$ comprise phenyl functional groups or substituted phenyl functional groups, and releasable portion is a chemical moiety capable of generating a detection/measurable response upon release.

2. The self-immolative molecule according to claim 1, wherein the detection/measurable response is generation of a colour or fluorescence.

3. The self-immolative molecule according to claim 1, comprising multiple releasable portions.

4. The self-immolative molecule according to claim 1, having structural formula:

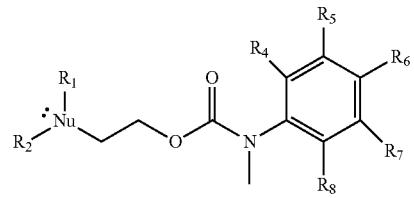

wherein Nu is P, $R_1$ and $R_2$ comprise phenyl functional groups or substituted phenyl functional groups, and $R_4$, $R_5$, $R_6$, $R_7$ and $R_8$ comprise between 0-3 methyl (CH$_3$) groups and at least 1 nitro (NO$_2$) group, with the remainder being hydrogen (H) atoms.

5. The self-immolative molecule according to claim 4, wherein $R_6$ is NO$_2$, and $R_4$, $R_6$, $R_7$ and $R_8$ are H.

6. The self immolative molecule according to claim 1, having the structural formula:

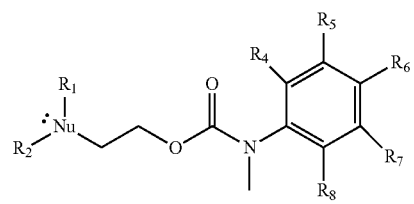

wherein Nu is P, $R_1$ and $R_2$ comprise phenyl functional groups or substituted phenyl functional groups, and $R_4$, $R_5$, $R_6$, $R_7$ and $R_8$ comprise at least 2 self-immolative portions, each linked to at least one releasable portion.

7. A self-immolative triggered method for interrogating a sample suspected of comprising a non-protic electrophilic agent comprising contacting the sample, in the presence of a mild base, with a self-immolative molecule suitable to be triggered by non-protic electrophilic agents, wherein the self-immolative molecule comprises at least one trigger portion linked to at least one releasable portion via a self-immolative portion, and wherein the self-immolative molecule has a structural formula:

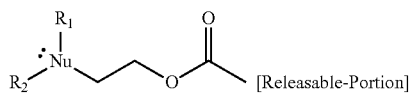

wherein Nu is phosphorus (P) and $R_1$ and $R_2$ comprise phenyl functional groups or substituted phenyl functional groups.

8. The self-immolative triggered method according to claim 7, wherein $R_1$ and/or $R_2$ comprise phenyl functional groups.

9. The self-immolative triggered method according to claim 8, wherein the releasable portion is a chemical moiety capable of generating a detection/measurable response upon release.

10. The self-immolative triggered method according to claim 7, wherein the non-protic electrophilic agent is an alkylating agent.

11. The self-immolative triggered method according to claim 7, wherein the mild base is diisopropylethylamine.

12. The self-immolative triggered method according to claim 7, wherein the sample is further contacted with the self-immolative molecule in the presence of an iodide salt.

* * * * *